(12) United States Patent
Okagaki

(10) Patent No.: US 7,142,889 B1
(45) Date of Patent: Nov. 28, 2006

(54) COMMUNICATION TERMINAL

(75) Inventor: Mitsunori Okagaki, Tottori (JP)

(73) Assignees: Sanyo Electric Co., Ltd. (JP); Tottori Sanyo Electric Co., Ltd. (JP)

( * ) Notice: Subject to any disclaimer, the term of this patent is extended or adjusted under 35 U.S.C. 154(b) by 0 days.

(21) Appl. No.: 09/642,911

(22) Filed: Aug. 21, 2000

Related U.S. Application Data

(63) Continuation of application No. PCT/JP99/07248, filed on Dec. 22, 1999.

(30) Foreign Application Priority Data

| Dec. 25, 1998 | (JP) | ................................. 10-369690 |
| Jan. 14, 1999 | (JP) | ................................. 11-008224 |
| Jan. 28, 1999 | (JP) | ................................. 11-020403 |
| Feb. 10, 1999 | (JP) | ................................. 11-032812 |
| Mar. 12, 1999 | (JP) | ................................. 11-066864 |
| Mar. 31, 1999 | (JP) | ................................. 11-093134 |

(51) Int. Cl.
*H04B 1/38* (2006.01)
*G06F 17/00* (2006.01)

(52) U.S. Cl. ...................... 455/566; 715/811; 715/828

(58) Field of Classification Search ................ 455/566, 455/568; 345/825, 811, 812, 813, 841, 810, 345/828, 829
See application file for complete search history.

(56) References Cited

U.S. PATENT DOCUMENTS

| 5,041,967 | A | * | 8/1991 | Ephrath et al. ............. 345/825 |
| 5,428,789 | A | * | 6/1995 | Waldron, III ............... 709/103 |
| 5,559,945 | A | | 9/1996 | Beaudet et al. |
| 5,572,648 | A | * | 11/1996 | Bibayan ..................... 345/825 |
| 5,579,472 | A | | 11/1996 | Keyworth et al. |
| 5,621,905 | A | * | 4/1997 | Jewson et al. .............. 345/841 |
| 5,625,783 | A | * | 4/1997 | Ezekiel et al. .............. 709/320 |
| 5,666,502 | A | * | 9/1997 | Capps ........................ 345/811 |
| 5,684,970 | A | * | 11/1997 | Asuma et al. .............. 345/775 |
| 5,694,563 | A | * | 12/1997 | Belfiore et al. ............. 345/821 |
| 5,737,394 | A | | 4/1998 | Anderson et al. |
| 5,867,162 | A | * | 2/1999 | O'Leary et al. ............. 345/843 |
| 5,905,964 | A | * | 5/1999 | Sudo .......................... 455/566 |
| 5,940,076 | A | * | 8/1999 | Sommers et al. ........... 345/834 |
| 5,987,336 | A | * | 11/1999 | Sudo et al. ................. 455/566 |

(Continued)

FOREIGN PATENT DOCUMENTS

DE          19600555          7/1997

(Continued)

OTHER PUBLICATIONS

Bill Camarda, "Using Microsoft Word 97", 1997, Que, Special Edition, p. 39-41.*

*Primary Examiner*—Ryan Yang
(74) *Attorney, Agent, or Firm*—Katten Muchin Rosenman LLP

(57) ABSTRACT

The control circuit 11 causes display of messages received through the communication unit 1 in the display unit 14 in list form. A cursor for making selections from the messages displayed in list form has different patterns. The control circuit 11 associates the cursor patterns with message types. In another embodiment, the control circuit 11 groups received messages into new messages not yet reproduced by a user and old messages already reproduced, causes display of the number of the new messages in a predetermined area of the display unit when the new messages are stored in RAM 13, and display of the number of the old messages in said predetermined area when the new messages are not stored in RAM 13.

21 Claims, 27 Drawing Sheets

U.S. PATENT DOCUMENTS

| | | | | |
|---|---|---|---|---|
| 5,999,159 | A * | 12/1999 | Isomura | 345/418 |
| 6,005,577 | A * | 12/1999 | Breitlow | 345/825 |
| 6,091,956 | A * | 7/2000 | Hollenberg | 455/550 |
| 6,121,968 | A * | 9/2000 | Arcuri et al. | 345/825 |
| 6,122,530 | A * | 9/2000 | Overy et al. | 455/566 |
| 6,125,287 | A * | 9/2000 | Cushman et al. | 455/412 |
| 6,131,048 | A * | 10/2000 | Sudo et al. | 455/566 |
| 6,144,863 | A * | 11/2000 | Charron | 379/387.01 |
| 6,223,058 | B1 * | 4/2001 | Sudo et al. | 455/564 |
| 6,232,972 | B1 * | 5/2001 | Arcuri et al. | 715/815 |
| 6,233,972 | B1 * | 5/2001 | Foster et al. | 65/60.3 |
| 6,263,217 | B1 * | 7/2001 | Park | 379/88.11 |
| 6,266,060 | B1 * | 7/2001 | Roth | 345/853 |
| 6,381,474 | B1 * | 7/2001 | Kraft | 455/550 |
| 6,320,943 | B1 * | 11/2001 | Borland | 379/112.01 |
| 6,363,264 | B1 * | 3/2002 | Overy et al. | 455/566 |
| 6,381,468 | B1 * | 4/2002 | Larsen et al. | 379/88.11 |
| 6,415,164 | B1 * | 7/2002 | Blanchard et al. | 379/387.01 |
| 6,433,801 | B1 * | 8/2002 | Moon et al. | 379/112.01 |
| 6,449,624 | B1 * | 9/2002 | Hammack et al. | 455/412 |
| 6,456,304 | B1 * | 9/2002 | Angiulo et al. | 455/564 |
| 6,583,797 | B1 * | 6/2003 | Roth | 345/810 |

FOREIGN PATENT DOCUMENTS

| | | |
|---|---|---|
| EP | 0 088 644 A1 | 9/1983 |
| EP | 0659004 | 6/1995 |
| EP | 0 679 003 B1 | 10/1995 |
| EP | 0726657 | 8/1996 |
| EP | 0751627 | 1/1997 |
| EP | 0886414 | 12/1998 |
| JP | 05135050 A | 6/1993 |
| JP | 09128407 A | 5/1997 |

* cited by examiner

FIG. 3

| NUMBER | DATE & TIME OF RECEPTION | GROUP 0:ORDINARY 1:PREFERENTIAL | MESSAGE |
|---|---|---|---|
| 1 | A(1)=990124070743 | B(1)=0 | C$(1)="HAPPY BIRTHDAY, MEE!" |
| 2 | A(2)=990124071239 | B(2)=1 | C$(2)="PM5 WAITING AT PARK ^-^ SHIN" |
| 3 | A(3)=990124092322 | B(3)=0 | C$(3)="COME HOME EARLY TODAY. MOM" |
| 4 | A(4)=990124123047 | B(4)=0 | C$(4)="A PRESENT IS IN THE LOCKER-YUKA" |
| 5 | A(5)=990124123429 | B(5)=1 | C$(5)="COME STRAIGHT HOME! DAD" |
| 6 | A(6)=990124124531 | B(6)=0 | C$(6)="HOW ABOUT KARAOKE? MARI" |

FIG. 4A

```
> HAPPY BIRTHDAY
  PM5 WAITING A
  COME HOME EARL
  A PRESENT IS I
  COME STRAIGHT
  HOW ABOUT KARA
```

FIG. 4B

```
  HAPPY BIRTHDAY
» PM5 WAITING A
  COME HOME EARL
  A PRESENT IS I
  COME STRAIGHT
  HOW ABOUT KARA
```

FIG. 5A

```
  HAPPY BIRTHDAY
  PM5 WAITING A
  COME HOME EARL
  A PRESENT IS I
» COME STRAIGHT
  HOW ABOUT KARA
```

FIG. 5B

```
  HAPPY BIRTHDAY
  PM5 WAITING A
  COME HOME EARL
  A PRESENT IS I
> COME STRAIGHT
  HOW ABOUT KARA
```

FIG. 8

| VOICE MESSAGE | TEXT MESSAGE | | |
|---|---|---|---|
| CALLER'S NUMBER | CALLER'S NUMBER | 0:NEW/1:OLD | CONTENTS |
| CALLER'S NUMBERV-1 | CALLER'S NUMBERT-1 | 1 | TEXT MESSAGE1 |
| CALLER'S NUMBERV-2 | CALLER'S NUMBERT-2 | 1 | TEXT MESSAGE2 |
| CALLER'S NUMBERV-3 | CALLER'S NUMBERT-3 | 1 | TEXT MESSAGE3 |
| CALLER'S NUMBERV-4 | CALLER'S NUMBERT-4 | 0 | TEXT MESSAGE4 |
| | CALLER'S NUMBERT-5 | 0 | TEXT MESSAGE5 |
| | | | |
| | | | |

FIG. 9

```
4 voice
2 new text
```

FIG. 10

| VOICE MESSAGE | TEXT MESSAGE | | |
|---|---|---|---|
| CALLER'S NUMBER | CALLER'S NUMBER | 0:NEW/1:OLD | CONTENTS |
| CALLER'S NUMBERV-1 | CALLER'S NUMBERT-1 | 1 | TEXT MESSAGE1 |
| CALLER'S NUMBERV-2 | CALLER'S NUMBERT-2 | 1 | TEXT MESSAGE2 |
| CALLER'S NUMBERV-3 | CALLER'S NUMBERT-3 | 1 | TEXT MESSAGE3 |
| CALLER'S NUMBERV-4 | CALLER'S NUMBERT-4 | 1 | TEXT MESSAGE4 |
| | CALLER'S NUMBERT-5 | 1 | TEXT MESSAGE5 |
| | | | |
| | | | |

FIG. 11

```
4 voice
5 old text
```

CONVERT CONTROL CODE EXCEPT "LINE FEED" INTO "SPACE"

CONVERT SUCCESSIVE "SPACES" INTO ONE "SPACE"

CONVERT SUCCESSIVE "LINE FEEDS" INTO ONE "LINE FEED"

CONVERT A SERIES OF "LINE FEED" AND "SPACE" INTO ONE "LINE FEED"

FIG. 25A

[FIRST LAYER]

| MENU p.1/2 ↓ |
|---|
| 1:OPTION1 |
| 2:OPTION2 |
| 3:OPTION3 |
| 4:OPTION4 |

FIG. 25B

| MENU p.2/2 ↑ |
|---|
| 5:OPTION5 |
| 6:OPTION6 |
| 7:OPTION7 |

FIG. 25C

[SECOND LAYER (MENU6)]

| MENU6 p.1/2 ↓ |
|---|
| 1:OPTION6-1 |
| 2:OPTION6-2 |
| 3:OPTION6-3 |
| 4:OPTION6-4 |

FIG. 25D

| MENU6 p.2/2 ↑ |
|---|
| 5:OPTION6-5 |
| 6:OPTION6-6 |
| 7:OPTION6-7 |

FIG. 26A

| MENU p.1/2 ↓ |
|---|
| 1:OPTION1 |
| 2:OPTION2 |
| 3:OPTION3 |
| 4:OPTION4 |

| MENU p.2/2 ↑ |
|---|
| 5:OPTION5 |
| 6:OPTION6 |
| 7:OPTION7 |

| MENU6 p.1/2 ↓ |
|---|
| 1:OPTION6-1 |
| 2:OPTION6-2 |
| 3:OPTION6-3 |
| 4:OPTION6-4 |

2a

FIG. 27A   FIG. 27B   FIG. 27C
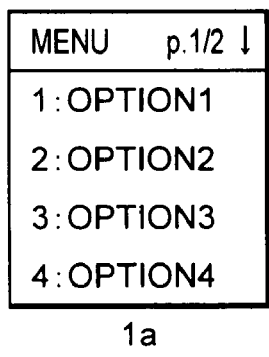
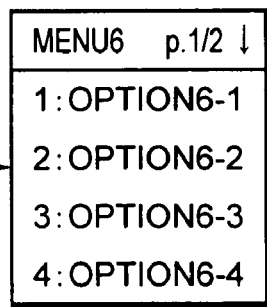
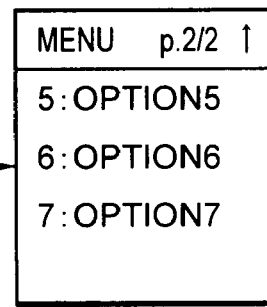
FIG. 28A   FIG. 28B   FIG. 28C
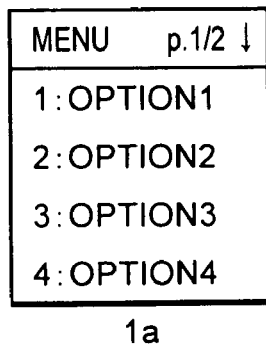
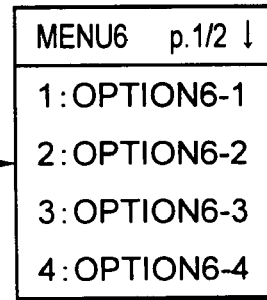
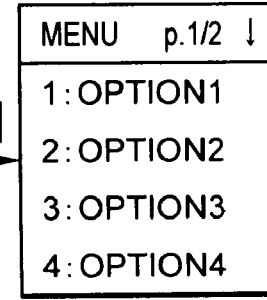

[FIRST LAYER]

FIG. 29A (1c)

| MENU | ↓ |
|---|---|
| 1:OPTION1 | |
| 2:OPTION2 | |
| 3:OPTION3 | |
| 4:OPTION4 | |

FIG. 29B (1d)

| MENU | ↑↓ |
|---|---|
| 2:OPTION2 | |
| 3:OPTION3 | |
| 4:OPTION4 | |
| 5:OPTION5 | |

FIG. 29C (1e)

| MENU | ↑↓ |
|---|---|
| 3:OPTION3 | |
| 4:OPTION4 | |
| 5:OPTION5 | |
| 6:OPTION6 | |

FIG. 29D (1f)

| MENU | ↑ |
|---|---|
| 4:OPTION4 | |
| 5:OPTION5 | |
| 6:OPTION6 | |
| 7:OPTION7 | |

[SECOND LAYER (MENU6)]

FIG. 29E (2c)

| MENU6 | ↓ |
|---|---|
| 1:OPTION6-1 | |
| 2:OPTION6-2 | |
| 3:OPTION6-3 | |
| 4:OPTION6-4 | |

FIG. 29F (2d)

| MENU6 | ↑↓ |
|---|---|
| 2:OPTION6-2 | |
| 3:OPTION6-3 | |
| 4:OPTION6-4 | |
| 5:OPTION6-5 | |

FIG. 29G (2e)

| MENU6 | ↑↓ |
|---|---|
| 3:OPTION6-3 | |
| 4:OPTION6-4 | |
| 5:OPTION6-5 | |
| 6:OPTION6-6 | |

FIG. 29H (2f)

| MENU6 | ↑ |
|---|---|
| 4:OPTION6-4 | |
| 5:OPTION6-5 | |
| 6:OPTION6-6 | |
| 7:OPTION6-7 | |

COMMUNICATION TERMINAL

This application is a continuation of PCT International application No. PCT/JP/07248, filed Dec. 22, 1999, designating the United States of America, the contents of which are incorporated by reference into the present application.

TECHNICAL FIELD

The present invention relates to a communication terminal, especially a communication terminal whose display unit having a limited display area is effectively used to improve its handiness.

BACKGROUND ART

The communication terminal of the present invention is typically a mobile communication terminal, especially a pager (pocket bell), a PHS (personal handy phone system) phone, a cellular phone and the like. Personal computers endowed with communication capability are also included therein.

Functions which communication terminals are provided with are increasing in number to meet various user demands. On the other hand, miniaturization of some communication terminals moves forward, and therefore, the display areas of their display units are becoming smaller. Consequently, the need of realizing more functions using a smaller display area is becoming stronger.

One of the functions which a communication terminal is provided with is storage and reproduction of messages. It enables sending a message from a transmitting terminal to a receiving terminal via a switching station, and reproducing the message at the receiving terminal. The message may be a message of character codes or a voice message. In the case of a text message, the switching station transmits the message to the receiving terminal, which is stored in a memory unit within the receiving terminal until it is reproduced or displayed by an addressee. In the case of a voice message, the voice data in itself is stored in a voice mail center within the switching station, and information indicating existence of the voice message is transmitted from the station to the receiving terminal. The voice data is transmitted in response to an addressee's requirement, and reproduced (vocalized) at the receiving terminal.

There is a communication system which can transmit identifying information together with a message, the information indicating whether the message is a preferential (urgent) one or not. The communication system based on U.S. standard TIA/EIA/IS637 is one example thereof. There is also a communication terminal which holds a message even after the message is reproduced until it is deleted by a specific deleting operation.

In such a communication terminal provided with a message displaying facility, it is desirable to provide indications to distinguish a preferential message from ordinary messages at the time of displaying them in list form. However, it is impracticable when the displaying area is small.

Further, although it is convenient to indicate not only the number of text messages not yet reproduced but the number of text messages already reproduced as well, it is also impracticable when the displaying area is small.

Further, the full text of a message cannot be displayed at a time if it is long, and it has to be scrolled long, which causes inconvenience in reading the message. This problem can be serious when displaying E-mail of a long text from a personal computer and the like in the display unit of a communication terminal, such as a cellular phone.

Further, there is a communication terminal which, when there arises reception error or memory overflow while it is used for voice communication, indicates information immediately on its current screen to notify a user of that status if it is urgent, and if it is not urgent, indicates the information at the time of returning to the initial screen. In such a communication terminal, if the power is turned off before returning to the initial screen, the information is not indicated, and accordingly the user can not meet the information until the power is turned on next.

There is also a communication terminal in which, for making a setting of the volume of a sound, such as a received sound, transmitting sound, key click sound and the like, a setting of illuminating time of the backlight, a setting of notifying procedure of an incoming call, and for lookup in a phone directory and so on, an operation which includes selecting one of options in each selection screen (a menu screen) to open the next menu screen, is repeated in order to make desired settings by selecting necessary functions. Since the number of options that can be displayed in the display area is limited, there is known a system that enables making a selection from options other than those currently displayed in the display area by operating a ten-key pad. In such a case allowing selection of options other than those currently displayed in the display area, when a return to the previous screen has been made, the option selected is not displayed, which causes inconvenience.

Furthermore, in a communication terminal of cellular phone type in which one of an external speaker and an external microphone, and an internal speaker and an internal microphone can be selected, it is preferable to indicate the status of the selection. However, it may be impossible if the display area is small.

DISCLOSURE OF INVENTION

The present invention has been made to solve the aforesaid problems, and the object thereof is to provide a communication terminal having an excellent handiness irrespective of its small display area.

The communication terminal of the first embodiment of the present invention comprises:

a communication unit (1,3) for receiving messages and type information of said messages from a station;

a display unit (14); and control means (11) which displays said messages received by said communication unit in list form in said display unit, a cursor which makes a selection from said messages displayed in list form having different patterns, said control means associating said patterns of said cursor with message types.

According to the above structure, even if a display screen is small, it is possible to display a cursor and messages types at a time, since the cursor displayed in a list also indicates message types.

The communication terminal of the second embodiment of the present invention comprises:

memory means (13) for storing messages received from a station;

a display unit (14); and control means (11) which groups received messages into new messages not yet reproduced by a user and old messages already reproduced, causes display of the number of said new messages in a predetermined area of said display unit when said new messages are stored in said memory means, and causes display of the number of said old messages in said predetermined area when said new messages are not stored in said memory means.

According to the above structure, it is possible to display the number of various types of message in a small area, since one of the number of old text messages and the number of new text messages is displayed depending on the existence of the new text messages.

The communication terminal of the third embodiment of the present invention comprises:

a reception circuit (3) for receiving text information including spaces;

a display unit (14);

a memory unit (13); and control means (11) which stores received text information in said memory unit combining successive spaces into one space, if said received text information has said successive spaces, and causes display of said stored text information in said display unit.

The communication terminal of the fourth embodiment of the present invention comprises;

a reception circuit (3) for receiving text information including line feeds;

a display unit (14);

a memory unit (13); and control means (11) which stores received text information in said memory unit combining successive line feeds into one line feed, if said received text information has said successive line feeds, and causes display of said stored text information in said display unit.

The communication terminal of the fifth embodiment of the present invention comprises;

a reception circuit (3) for receiving text information including spaces and line feeds;

a display unit (14);

a memory unit (13); and a control means (11) which stores said received text information combining a series of a space and a line feed into one line feed if said received text information has said series of a space and a line feed, and causes display of said stored text information in said display unit.

The communication terminal of the sixth embodiment of the present invention comprises:

a reception circuit (3) for receiving text information including control information such as a line feed;

a display unit (14);

a memory unit (13); and control means (11) which stores received text information in said memory unit converting received control information except a line feed into a space, and displays said stored text information in said display unit.

According to the above structure, it is possible to reduce memory space when receiving successive line feeds or spaces, and effectively use the small display area. Further, when the communication terminal receives any control information which the communication terminal does not support, it is possible to make a notification of the existence thereof.

The communication terminal of the seventh embodiment of the present invention comprises:

memory means (13) for storing information to be notified;

a display unit (14) for displaying a predetermined screen or said information to be notified;

an input unit (16) where operation is performed; and control means (11) which causes display of said information to be notified when operation is performed to turn off power supply in said input unit during display of said predetermined screen.

The communication terminal of the eighth embodiment of the invention comprises:

memory means (13) for storing information to be notified;

a display unit (14) for displaying an initial screen, a lower screen as a lower layer of said initial screen, and said information to be notified;

an input unit (16) where operation is performed; and control means (11) which allows display of said information to be notified in said initial screen and prohibits display of said information to be notified in said lower screen, and displays said information to be notified when operation is performed to turn off power supply in said input unit during display of said lower screen.

Said initial screen may be the one during standby or the one during communication.

According to the above structure, it is possible to prevent a user from being unaware of information to be notified and not yet acknowledged by turning off the power supply when it is hiding.

The communication terminal of the ninth embodiment of the present invention comprises:

a display unit (14) which displays a selection screen for selecting at least one of a plurality of options; and display control means (11) which causes display of options in said display unit by division or scroll to enable selecting an option not currently displayed in said display unit from the options to be selected, causes, when an option not currently displayed has been selected, a display of a screen associated with said selected option in said display unit, and performs a display so as to include said selected option when displaying said selection screen next.

According to the above structure, it is possible for the user to recognize easily which option has been selected, because the selection screen is made to include the selected option when the selected option was not displayed in the previous screen at the time of returning to the previous selection screen from the screen associated with the selected option.

The communication terminal of the tenth embodiment of the present invention comprises:

a display unit (14) which displays a selection screen for selecting at least one of a plurality of options; and display control means (11) which causes display of options in said display unit by division or scroll to enable selecting an option not currently displayed in said display unit from the options to be selected, causes, when an option not currently being displayed has been selected, display of a screen associated with said selected option in said display unit, and causes display of information indicating said selected option when displaying said selection screen next.

According to the above structure, it is possible for the user to recognize easily which menu has been selected, because information on the option which has been selected is displayed at the time of returning to the previous selection screen from the screen associated with the selected option.

The communication terminal of the eleventh embodiment of the present invention comprises:

a rechargeable battery (30) which can be recharged by an external power supply;

recharge detection means (11, S131) for detecting whether said rechargeable battery (30) is under recharge by said external power supply (32);

placement detection means (26) for detecting whether an apparatus is placed in a placing unit;

a display unit (14) which indicates exhaustion level of said rechargeable battery;

an external speaker connecting unit (20a); and control means (11,S134,S138) which recognizes that an external speaker mode has been established and outputs received voices to said external speaker connecting unit (20a), prohibiting said exhaustion level of said rechargeable battery from being indicated when said recharge detection means detects that said rechargeable battery (30) is under recharge, and said placement detection means (29) detects that said apparatus is placed in said placing unit, and outputs no received voice to said external speaker connecting unit (20a), allowing exhaustion level of said rechargeable battery to be indicated except in said external speaker mode.

According to the above structure, when a communication terminal such as a cellular phone is carried in a vehicle and is being recharged, that state is indicated utilizing the battery indication area. Accordingly, the small display area can be used effectively.

BRIEF DESCRIPTION OF DRAWINGS

FIG. 3 is a view showing the contents of received messages.

FIGS. 4A and 4B are views showing change in a display of a list with cursor movement.

FIGS. 5A and 5B are views showing change in a display of a list with change of message types.

FIG. 8 is a view showing memory contents in case there are new text messages.

FIG. 9 is a view showing a display indicating the number of messages when there are new text messages.

FIG. 10 is a view showing memory contents in case there is no new text message.

FIG. 11 is a view showing a display indicating the number of messages when there is no new text message.

FIG. 25 is a view showing selection screens and screens of selected a selected menu of the fifth embodiment.

FIG. 26 is a view showing displays of screens of the fifth embodiment in case where a menu which has been selected was displayed in the previous selection screen.

FIG. 27 is a view showing displays of screens of the fifth embodiment in case where a menu which has been selected was not displayed in the previous selection screen.

FIG. 28 is a view showing an example of prior art corresponding to FIG. 27.

FIG. 29 is a view showing selection screens and screens of a selected menu of the sixth embodiment according to the present invention.

BEST MODE FOR CARRYING OUT THE INVENTION

The embodiments of this invention will be explained based on the drawings in the following.

The First Embodiment

Figure 1:
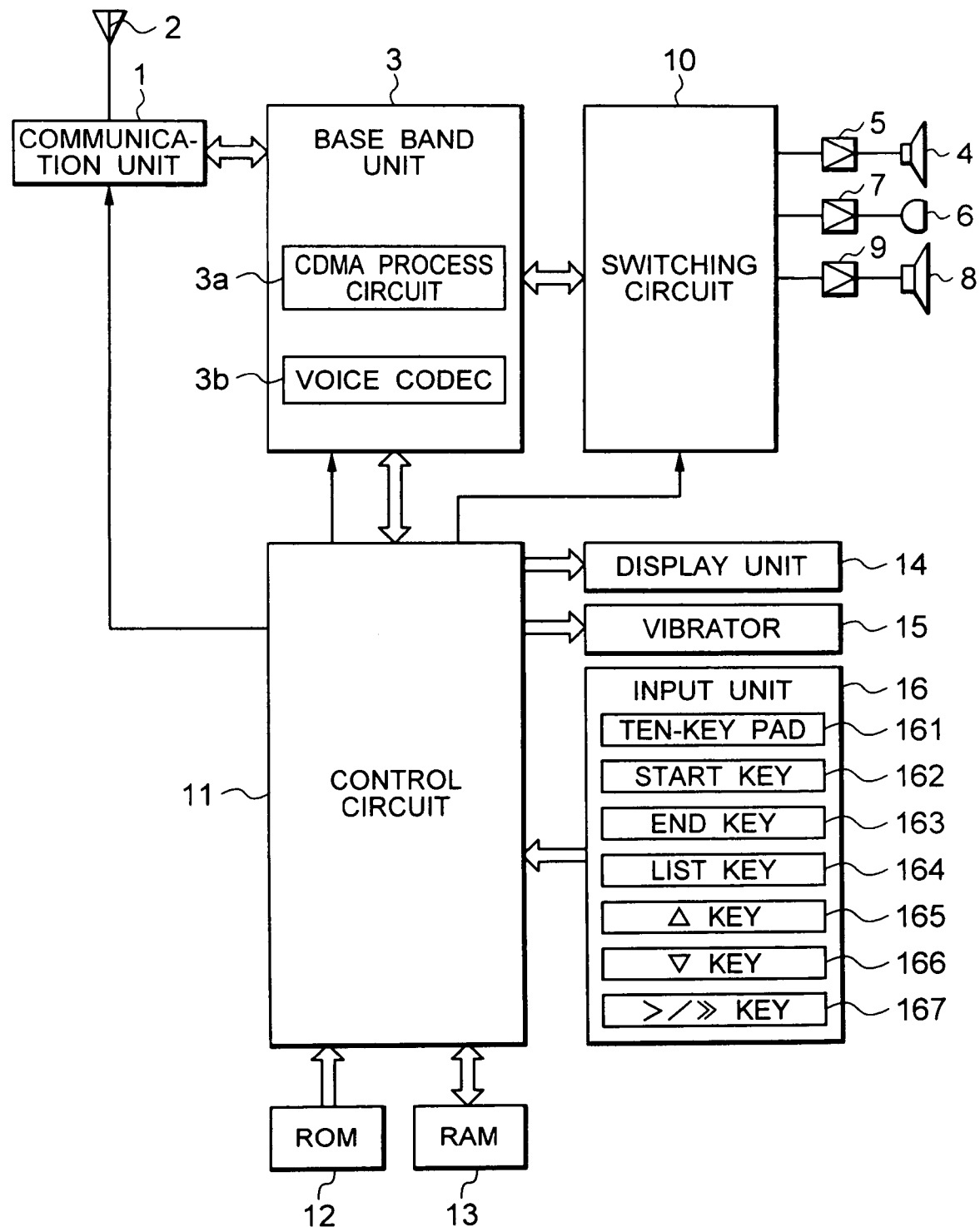
FIG. 1 is a block diagram showing principal elements of the first embodiment of the present invention.

FIG. 1 is a block diagram showing principal elements of the embodiment. The communication terminal of this embodiment is a cellular phone of the CDMA system which uses two or more carriers of the same frequency in the same cell.

A communication unit 1 transmits signals from a baseband unit 3 to a base station (not shown) through an antenna 2, and receives radio waves from the base station through the antenna 2.

The baseband unit 3 has a CDMA processing circuit 3a and a voice codec 3b. The CDMA processing circuit 3a performs a code division multiple access, scramble, error control, and timing detection. The voice codec 3b compresses (coding) and expands (decoding) voices, performs analog-digital conversion, and changes the volume of received voices and the sensitivity of a microphone by its internal amplification circuit (not shown).

A speaker 4 which is used for voice communication being held to one's ears converts the electric signals from the baseband unit 3 amplified in the amplification circuit 5 into voices.

A microphone 6 which is used for voice communication converts voices into electric signals. An amplification circuit 7 amplifies the output of the microphone 6, and outputs it to the baseband unit 3.

A speaker 8 is for making a voice communication heard by a person nearby, and disposed at the back of the receiving unit (the plane opposite the plane in which the ear-speaker 4 is placed). This speaker 8 converts the electric signals of the baseband unit 3 amplified in the amplification circuit 9 into voices. The speaker 8 also sounds to give a notice of an incoming call.

A switching circuit 10 switches the connection between each three amplification circuits 5, 7, and 9 and the baseband unit 3 under control of the control circuit 11.

These three amplification circuits 5, 7, and 9 have their gains fixed, and can not change the volume of received voices, and sensitivity of the microphone. The voice codec 3b of the baseband unit 3 performs changes of the volume of received voices, and the sensitivity of the microphone under control of the control circuit 11.

The control unit 11 comprises a microprocessor, and controls each unit based on operating programs stored in ROM12. RAM13 stores information required for operation of the control circuit 11.

The liquid crystal display unit 14 displays a telephone number dialed, a caller's number, a telephone directory, etc.

A vibrator 15 generates vibration under control of the control circuit 11 at the time of receiving a call.

An input unit has a ten-key pad 161 for making an input of a telephone number etc., start key 162 for starting a communication, end key 163 for terminating a communication, a list key 164 for displaying messages in a list, Δ key 165 for moving a cursor in the list upwards (returning the cursor back), ∇ key 165 for moving the cursor in the list downwards (advancing the cursor forward), and >/>> key for switching ordinary/preferential of a message.

Here, a message is text information which a caller transmits, and the caller can specify ordinary/preferential of a message. The communication terminal of this embodiment is a cellular phone, and the size of its display unit 14 is as small as 15-half size character (15 columns) by 6-line size.

Figure 2:
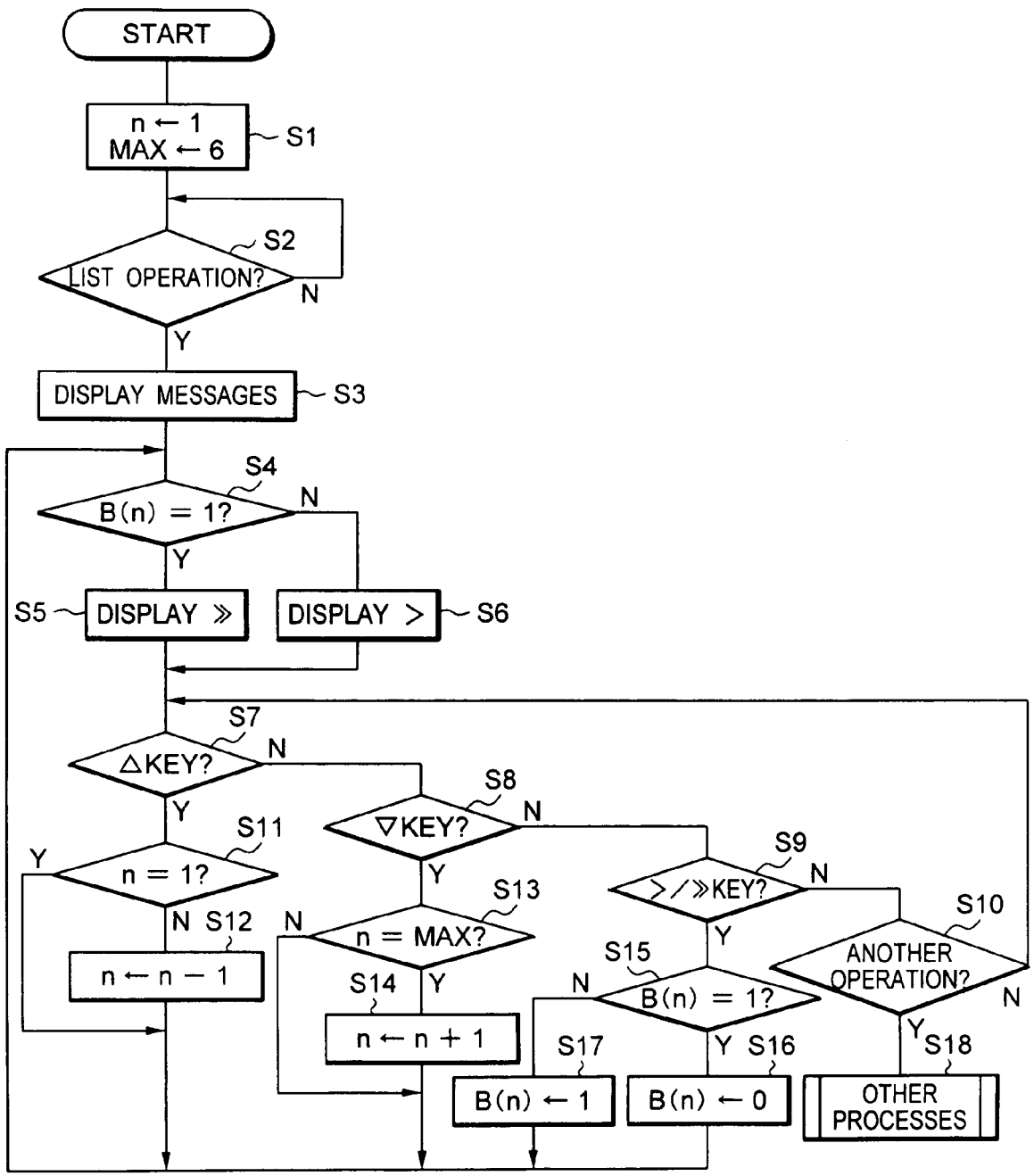
FIG. 2 is a flow chart showing the principal operation of the first embodiment.

The operation of the display in list form of the first embodiment will now be explained. FIG. 2 is a flow chart showing operation of the control circuit 11, FIG. 3 shows messages which are received and stored in RAM13, and FIG. 4A, FIG. 4B, FIG. 5A and FIG. 5B show lists of the messages displayed in their display units.

As shown in FIG. 3, it is assumed that there are six messages which were received. In the order of reception time, the date and time, distinction between ordinary and preferential, and the message itself are stored. "n" in A (n), B (n), and C$ (n) is a variable which represents the message number in a list. Further, the position of a cursor is stored in a buffer of the control circuit 11. A (n) is a variable which represents the date and time. B (n) is a variable which distinguishes ordinary/preferential, where B(n)=0 refers to a ordinary message, and B(n)=1 refers to a preferential message. C$ (n) is a variable representing a character of a message. MAX is a variable representing the total number of stored messages.

In FIG. 2, the control circuit 11 locates the cursor in the first position, that is, sets the variable n to 1 and sets MAX to "6" as an initial value (S1). This value "6" of MAX expresses the total number of messages. Next, when the list key 164 is pressed (Y in S2), the control circuit 11 displays, from the second column (the second half size character) to the fifteenth column (the fifteenth half size character), 14 half size characters for each of six messages (S3).

The symbol representing the cursor also represents message types in this embodiment. That is, a symbol ">>" or ">" is displayed on the position of the cursor, which express the message type simultaneously. To be more specific, a symbol ">>" will be displayed if the message is a preferential message (Y in S4, S5), and a symbol ">" will be displayed if the message is an ordinary message (N in S4, S6) at the first column of a line where the cursor is located.

Then, a watch is kept on any operation of Δ key 165, ∇ key 166, >/>> key 167, or other keys (S7–S10). The cursor is moved upward (S11, S12) when Δ key 165 is pressed (Y in S7) and moved downward (S13, S14) when ∇ key 166 is pressed (Y in S8). The cursor symbol is displayed to make provision for distinguishing ordinary/preferential with respect to a message where the cursor is positioned newly (S4 to S6).

Further, each time >/>> key 167 is pressed, (N in S9) the data of ordinary/preferential in RAM (13) is changed (S15–S17), and the character of the cursor is also changed (S4–S6).

For example, when ∇ key 166 is pressed in a state where the cursor is in the first line as shown in FIG. 4A, the cursor is moved to the next lower line as shown in FIG. 4B. At the same time, the symbol changes to ">>" from ">". It is because the message at the first line is "ordinary one", and the data at the second line is "preferential one".

In contrast to the above, when Δ key 165 is pressed in the initial state where the cursor is in the second line as shown in FIG. 4B, the cursor is moved to the next upper line as shown in FIG. 4A. At the same time, the symbol changes to ">" from ">."

Further, when >/>> key 167 is pressed in a state where the symbol of the cursor is ">>" as shown in FIG. 5A (the cursor is displayed in the fifth line in FIG. 5A), the symbol of the cursor changes to ">" as shown in FIG. 5B. Further, when >/>> key 167 is pressed in a state where the symbol of the cursor is ">" as shown in FIG. 5B, the symbol of the cursor changes to ">>" as shown in FIG. 5A. As described above, distinction between ordinary/preferential can be made at the receiving end.

In the above-mentioned instance, the reference has been made to the case where there are six received messages. If there are seven or more messages, six of them will be displayed. When ∇ key 166 is pressed in a state where the cursor is in the bottommost line, the next message appears, and the messages having been displayed are scrolled upwards by one line respectively. The message having been displayed in the topmost line disappears. When the above "the next message" does not exist, the contents of the display remain unchanged. When Δ key 165 is pressed in a state where the cursor is in the topmost line, the immediately preceding message appears, and the messages having been displayed are scrolled downwards by one line respectively. The message having been displayed in the bottommost line disappears. When the immediately preceding message does not exist, the contents of the display remains unchanged.

In the above embodiment, although there are two message types of ordinary and preferential, it is possible to apply the present invention to cases having more message types.

Further, in the above embodiment, although display of the cursor is in the form of a symbol, it is possible to distinguish message types by a specific form of display other than symbols, for example, by a degree of meshing (half-tone dots) to the cursor.

According to the above-described embodiment, the cursor figuration serves also as message type indication, it is possible to indicate message types without enlarging the display screen.

The Second Embodiment

Figure 6:
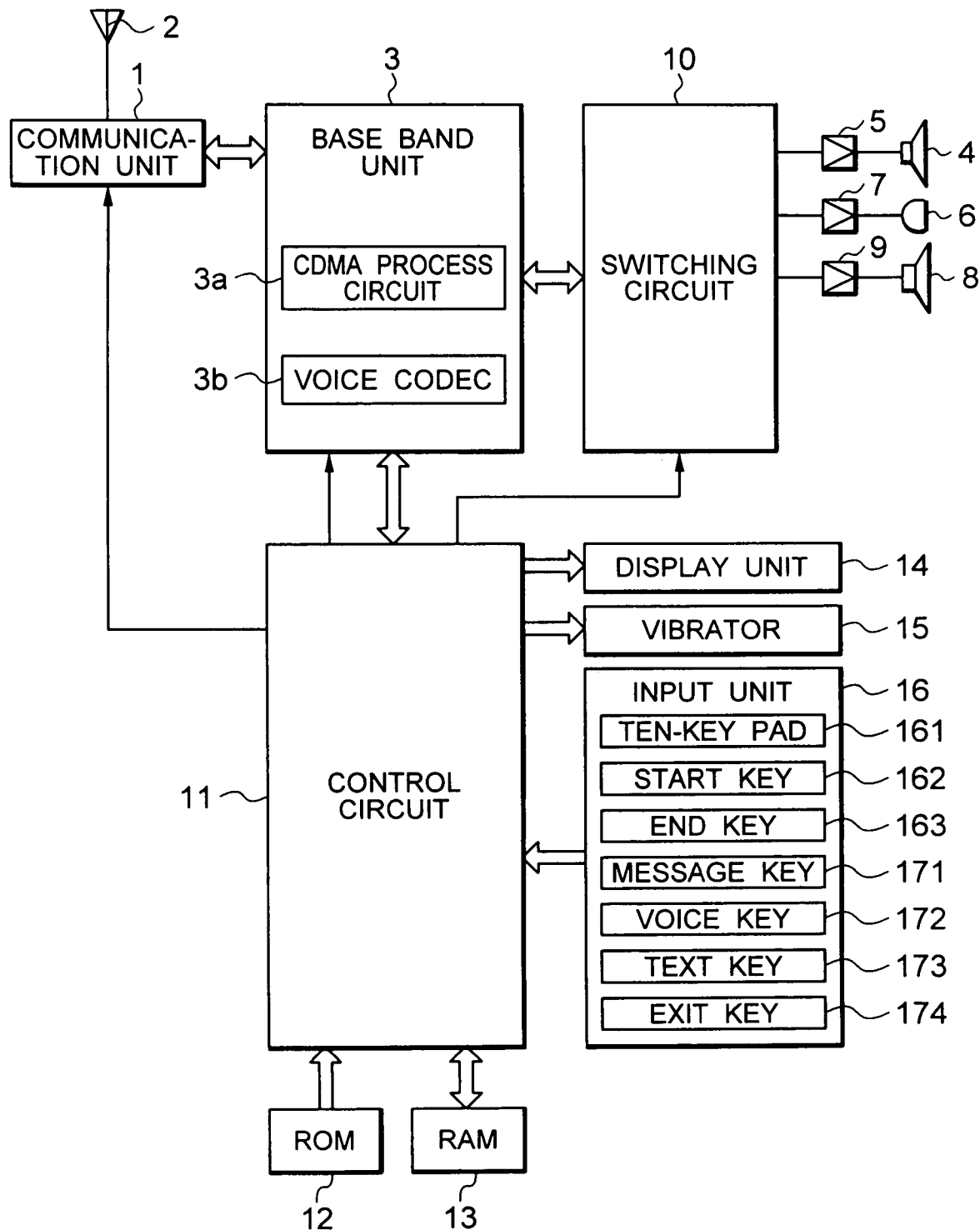
FIG. 6 is a block diagram showing principal elements of the second embodiment of the present invention.

The second embodiment of this invention will now be explained with reference to FIGS. 6 to 11. FIG. 6 shows the circuit structure of the second embodiment. In these figures, the reference numerals which are the same as those in FIG. 1 represent the same elements. Explanation of the reference numerals 1 to 11 is omitted.

The liquid crystal display unit 14 has the first display area and the second display area, and indicates the number of voice messages not yet vocalized in the first display area and indicates one of the number of text messages whose contents are not yet displayed and the number of text messages whose contents were already displayed in the second display area.

The input unit 16 is not provided with the keys 164 to 167 of FIG. 1, but instead has a message key 171 which is operated for displaying the number of messages, voice key 172 which is operated for vocalizing voice messages, text key 173 which is operated for displaying text messages, and exit key 174 which is operated for exiting processes.

Here, a message is information which a caller transmits which may be a voice message or a text message. After a caller performs message sending operation, a station transmits the message information, such as a caller's telephone number, to a communication terminal.

In the case of a text message, the text information of the received text message is stored in the communication terminal. Therefore, the text messages are grouped into new text messages whose contents are not yet displayed, and old messages whose contents were already displayed.

On the other hand, the voice data of a voice message is stored in a voicemail center of the station, sent out according to demand from the communication terminal, and vocalized at the communication terminal. Voice message are preserved for a long period of time until they are sent out, and erased within a predetermined short period of time after they are sent out. Since communication terminals cannot keep track of this erasure period correctly, communication terminals which do not store received voice messages are configured such that operation for vocalizing received vice messages cannot be repeated. Therefore, voice messages are not grouped into old ones and new ones.

It is possible to know the number of messages not yet vocalized, that is new messages, the number of new text messages, and the number of old messages from the number of information such as caller's numbers (refer to FIG. 8 and FIG. 10) stored in RAM13.

Figure 7:
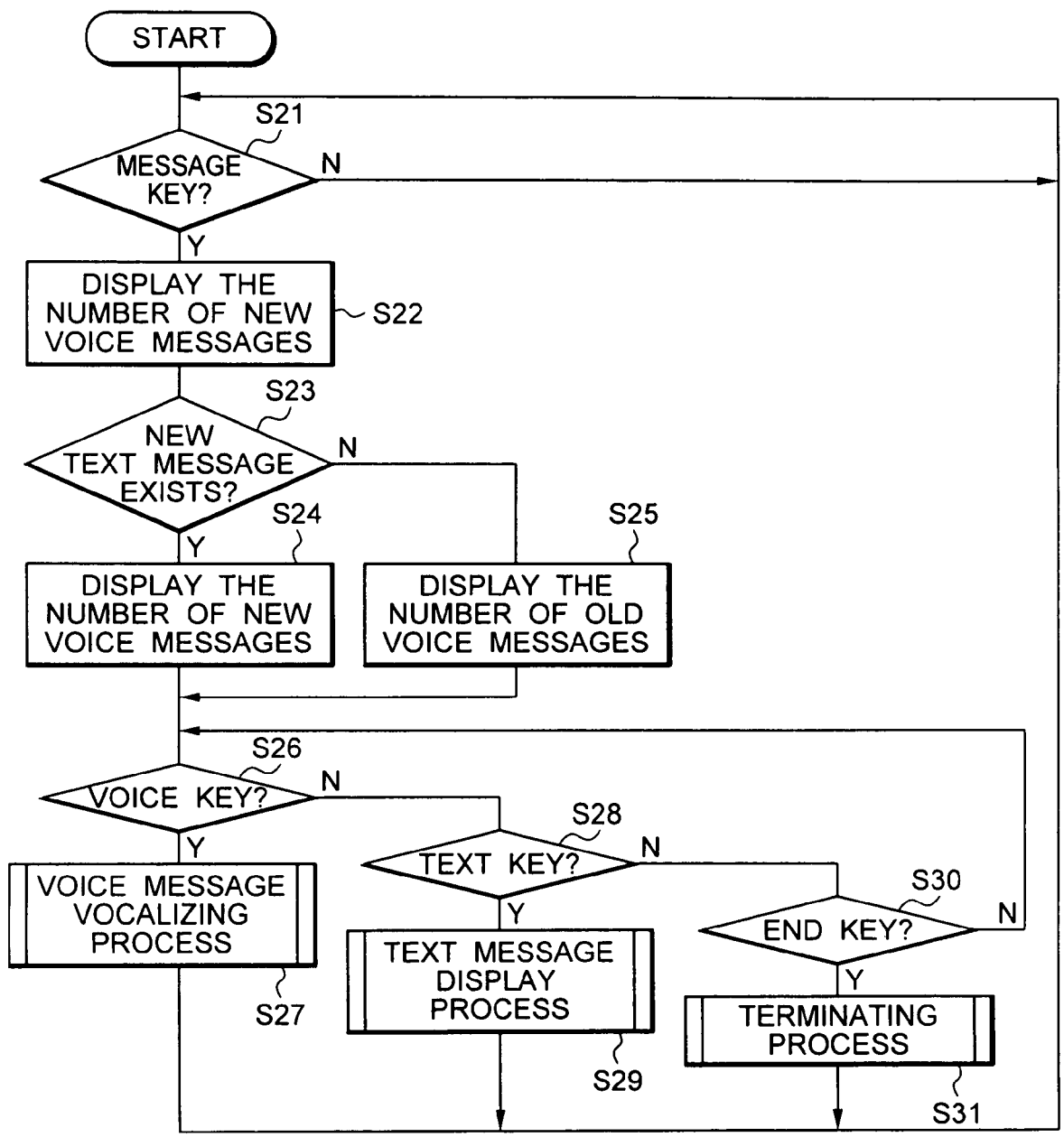
FIG. 7 is a flow chart showing essential operation of the second embodiment.

Operation of the display in list form in the second embodiment will now be explained. FIG. 7 is a flow chart showing the operation of the control circuit 11. When the message key 171 is operated (S21), the control circuit 11 displays on the display unit 14 the number of voice messages not yet vocalized (S22). Since operation of vocalizing voice messages cannot be repeated, the number of old voice messages is not displayed.

Next, existence of new text messages is checked (S23). When there exist new text messages (Y in S23), the number of the new text messages is indicated (S24). When there exists no new text message (N in S23), the number of old text messages is indicated (S25).

For example, as shown in FIG. 8, when data of four voice messages, data of three old text messages, and data of two new text messages are stored in RAM13, the control circuit 11 indicates that there are four voice messages and two new text messages, but does not indicate the number of old text messages as shown in FIG. 9.

Thereafter, when the user opens two new text messages, and therefore, the number of old text messages runs to five and the number of new text messages runs to zero as shown in FIG. 10, the number of new text messages (zero) is not indicated, but the number old text messages (five) is indicated as shown in FIG. 11.

Thus, by indicating one of the number of old text messages and the number of new text messages depending on the existence of new text message (s), it is possible to decrease the size of the displaying area.

When the number of voice messages and the number of text messages are displayed, the control circuit 11 performs processing for receiving voice messages from the station (Y in S26, S27) through the operation of the voice key 172, and displaying text messages stored in RAM 13 (Y in S28, S9) through the operation of the text key 173.

According to the above embodiment, since one of the number of old text messages and the number of new text messages is indicated depending on the existence of new text messages, it is possible to indicate the numbers of various types of message in the small displaying area.

The third embodiment of this invention will now be explained with reference to FIGS. 12 to 18.

Figure 12:
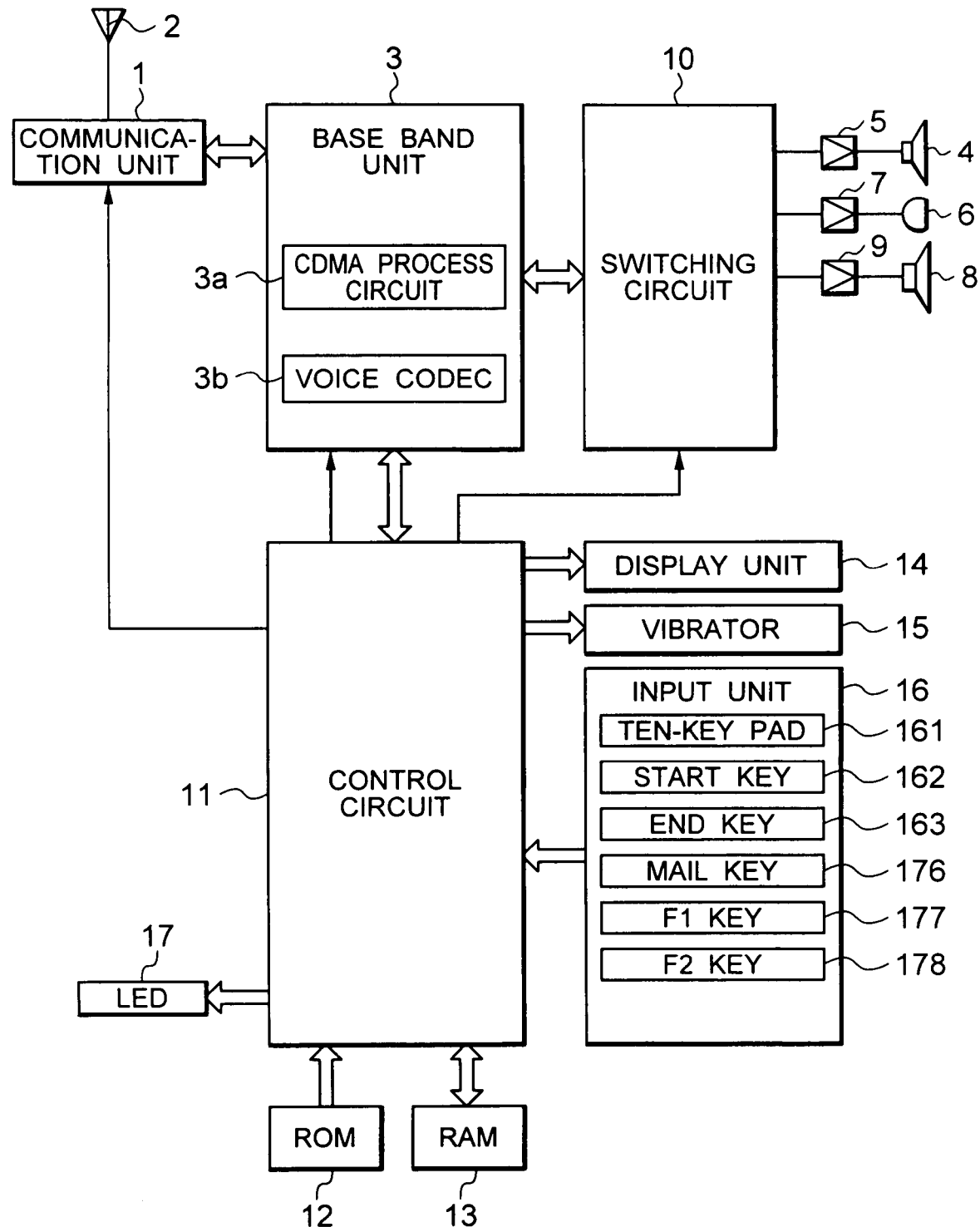
FIG. 12 is a block diagram showing principal elements of the third embodiment of the present invention.
Figure 13:
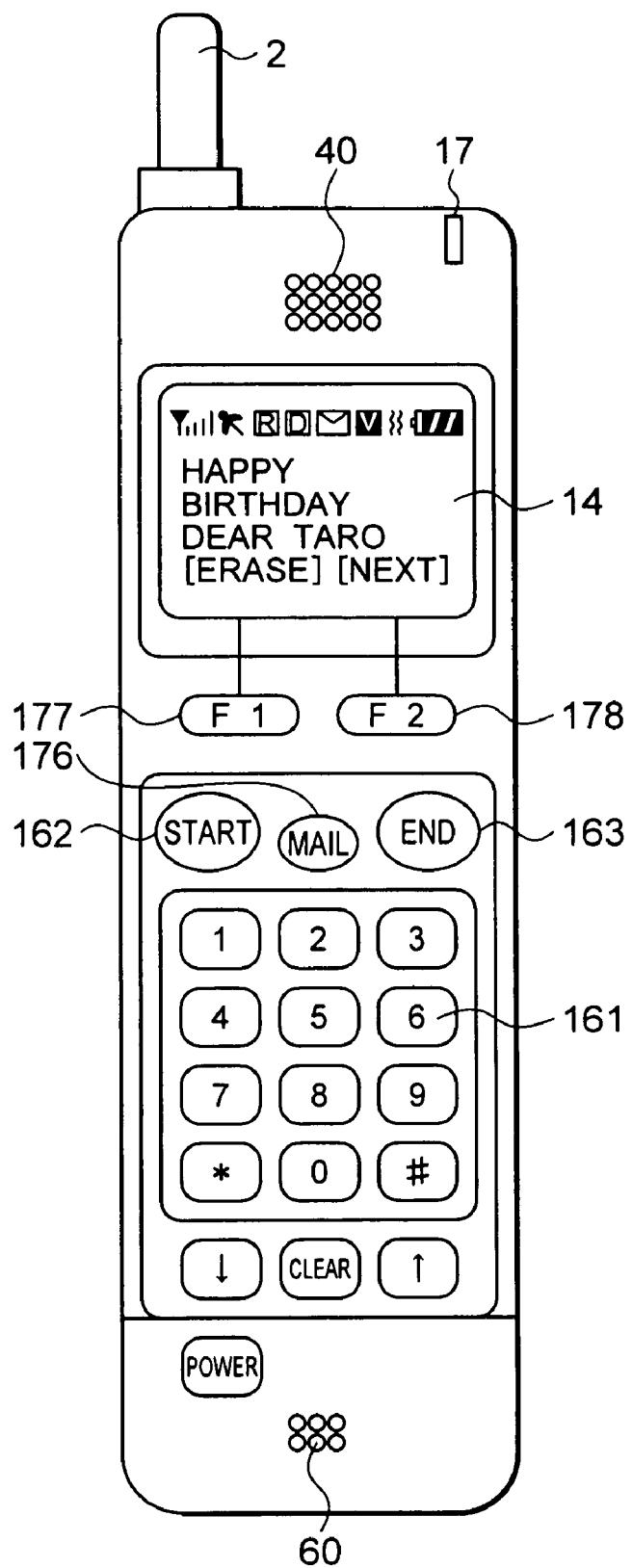
FIG. 13 is a front view of the third embodiment.

FIG. 12 is a block diagram showing principal elements of the embodiment, and FIG. 13 is a front view of this communication terminal. In these figures, the reference numerals which are the same as those in FIG. 1 represent the same elements. Explanation of the reference numerals 1 to 11 and 15 is omitted.

The communication unit 1 transmits signals of voice communication or text messages to a base station through an antenna 2, or receives radio waves of voice communication or text messages through the antenna 2.

A speaker 8 outputs a sound for making a notification of an incoming call of voice communication or messages.

A speaker 8 is used also for making voice communication heard by a person nearby as in the first embodiment, and is disposed at the back of the receiving unit J in which the ear-speaker 4 is placed.

The liquid crystal display unit 14 indicates the status of communication, remaining capacity of a battery, etc. in the first line, indicates the contents of a text message in the second to fourth lines, and indicates functions of F1 key 177 and F2 key 178 which will be described below in a message displaying screen, as shown in FIG. 13. The area for displaying the contents of a text message has a 12-half size character by 3-line size.

The input unit 16 is not provided with the keys 164 to 167 in FIG. 1, but has a mail key 176, F1 key 177, and F2 key 178 instead. The mail key 176 is operated for checking reception of text message.

F1 key 177 and F2 key 177 are operated for performing operations corresponding to texts displayed in the fifth line of the display unit 14.

FIG. 13 shows an example of F1 key 177. There is indication of "ERASE" at the place in the display unit 14 corresponding to F1 key 177. Operation of F1 key 177 performs erasure of a text message displayed in this screen. Further, there is indication of "NEXT" at the place in the display unit 14 corresponding to 2 key 178. Operation of F2 key 178 performs display of the next text message in this screen.

LED 17 lights up at the time of receiving a call, while flickers at the time of receiving a text message.

Figure 14:
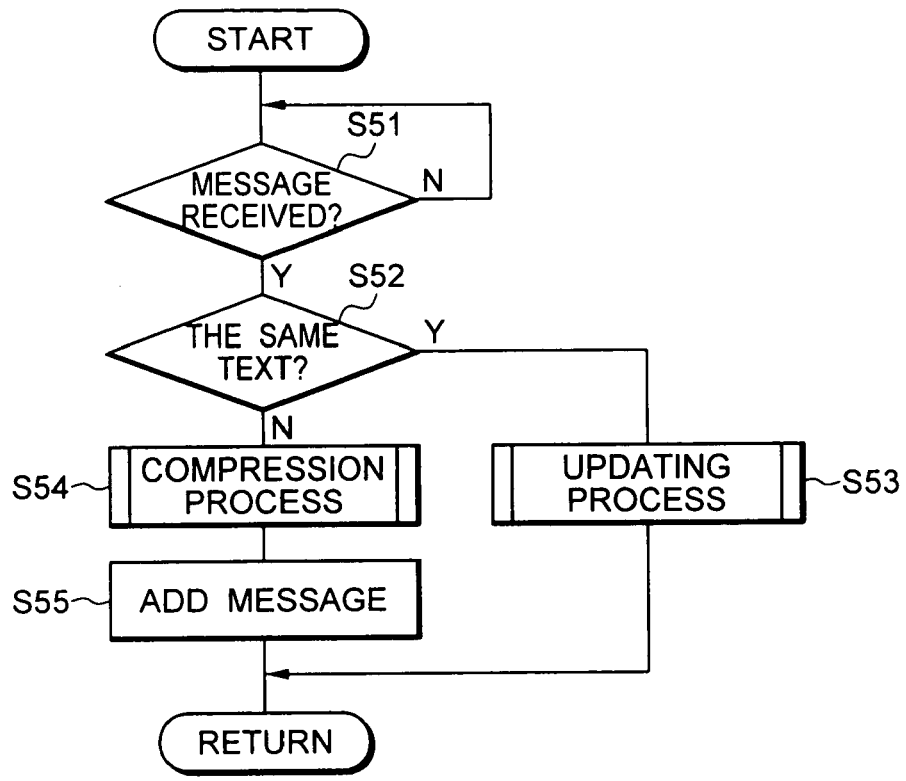
FIG. 14 is a flow chart showing principal operation of the third embodiment.

The principal operation of the third embodiment will now be explained. FIG. 14 is a flow chart showing the operation of the control circuit 11 at the time of receiving a text message. When the communication unit 1 receives information of a text message from the base station (Y in S51), the control circuit 11 checks whether the text of the contents of the text message is the same as a text message stored in RAM 13 (S52).

If they are the same, the control circuit 11 updates the information concerning the text message already stored by the below-mentioned updating processing (S53). That is, it cuts back the memory space of RAM 13 by not increasing the number of stored text messages.

If they are not the same, the control circuit 11 manipulates the contents of the text message by the below-mentioned compression process, and stores the text message which has undergone the compression process in RAM 13 (S55).

Figure 15:
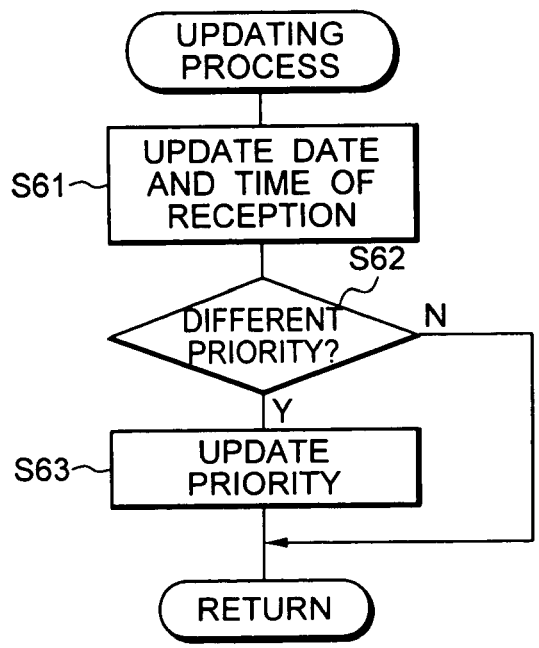
FIG. 15 is a flow chart showing the details of an updating process of FIG. 14.

FIG. 15 is a flow chart showing the updating process of FIG. 14 in detail. In the updating process, the control circuit 11 updates the date and time of reception (S61). If there is difference in additional information for distinguishing between ordinary and preferential of the text message (Y in S62), the information in this RAM 13 (S63) is rewritten.

Figure 16:
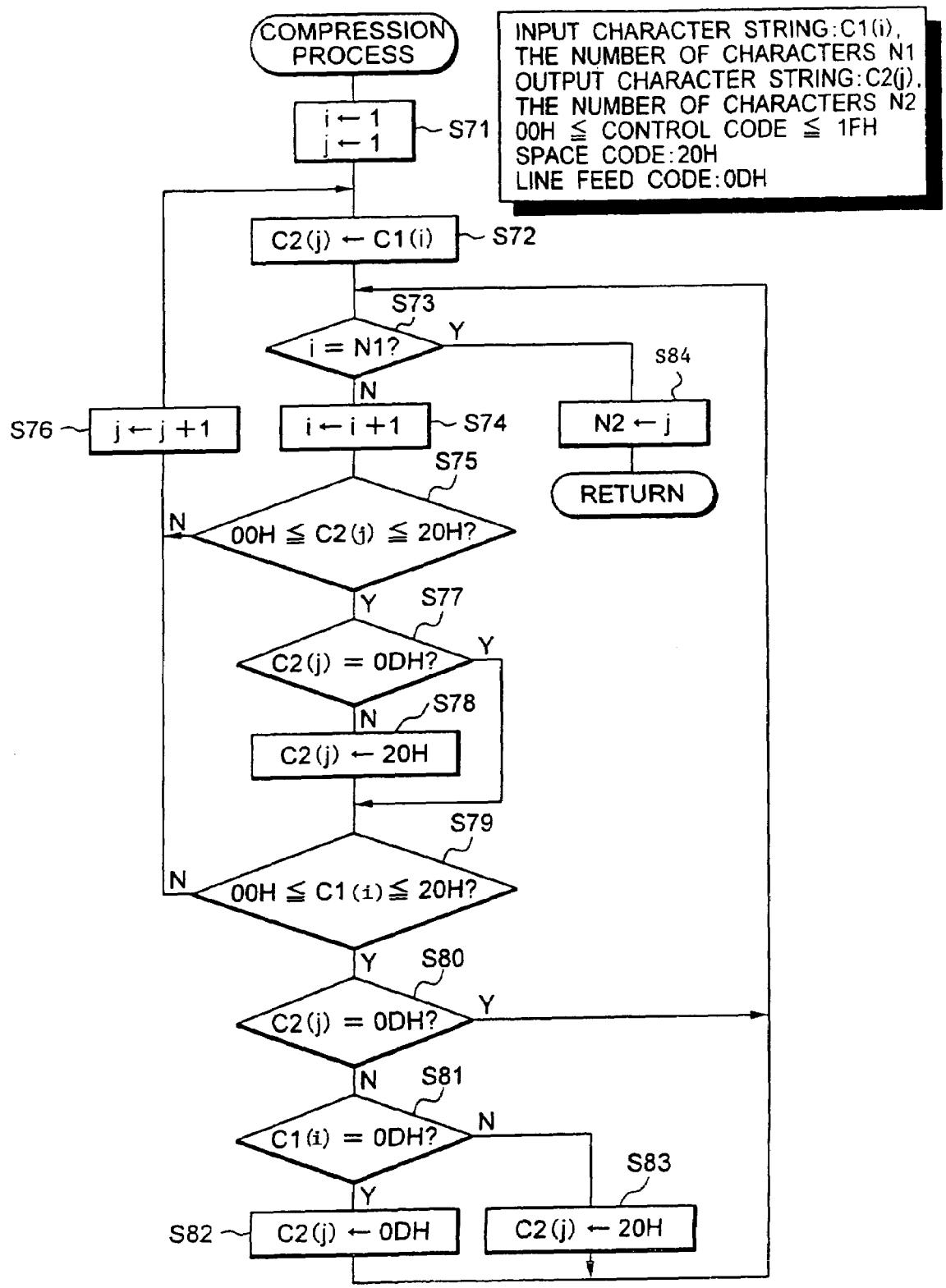
FIG. 16 is a flow chart showing the details of a compression process of FIG. 14.

FIG. 16 is a flow chart showing the compression process of FIG. 14 in detail. The control circuit 11 handles characters in the hexadecimal ASCII character code. The space code is 20H, control codes are 00H to 1FH, and a line feedcode (a code directing a carriage return and a line feed) is 0DH.

Here, a character string (a received character string) inputted for compression is represented as an array variable C1 ($i$) with N1 characters (i being a variable of a positive integer), and an output character string resulting from the compression is represented as an array variable C2 ($j$) with N2 characters (j being a variable of a positive integer). These variables are stored in a register (not shown) within the control circuit 11.

In the compression process in FIG. 15, the control circuit 11 sets the initial values of the variable i and the variable j to 1 (S71). Then, it lets the value (character code) of the array variable C2 ($j$) equal the value (character code) of the array variable C1 ($i$). That is, the value of the array variable C1 ($i$) is substituted into the value of the array variable C2 ($j$) (S72). Here, since i=1 and j=1, the first character of the output character string becomes the first character of the input character string.

In step S73, if the character just handled is the last character of the input character string, that is, if i=N1, the process ends up with letting the number of characters N2 of the output character string equal the value of variable j. The control circuit 11 lets the value of the variable N2 equal the value of the variable j (S84), and ends the process.

In step S73, If i=N1 does not hold, the control circuit 11 increments the variable i by 1 (S74). Then, it checks whether the code of the j-th character (C2($j$)) of the output character string is within 00H to 20H (S75). That is, it checks whether "the last character of the output character string under processing" is a control code or a space code.

In step S75, if C2 ($j$) is not within 00H to 20H (N in S75) the control circuit 11 increments the variable j (S76) by 1, and proceeds to step S72 to let C2 ($j$) equal C1 ($i$).

That is, if "the last character of the output current string" is not a control code or a space code, the current character (i) of the input character string is added as it is to the output character string (j←j+1). Thus, if step S76 and step S72 are performed, "the character under processing which is a candidate for an addition to the output string" is not deleted but stored.

In step S75, if C2 ($j$) is within 00H to 20H, and if C2 ($j$) is not 0DH (N in S77), the control circuit 11 sets C2 ($j$) to code 20H (S78), and proceeds to step S79. That is, if "the last character of the output character string under processing" is a control code or space code, and not a line feed code, it sets "the last character of the output character string under processing" to a space (S78) and proceeds to step S79. In step S77, if C2 ($j$) is 0DH, that is, if "the last character of the output character string under processing" is a line feed code, it proceeds to step S79.

In step S79, the control circuit 11 checks whether the i-th character code (C1($i$)) of the input character string is within 00H to 20H (S79). That is, it checks whether "the character under processing which is a candidate for an addition to the output character string" is a control code or a space code.

In step S79, if C1 ($i$) is not within 00H to 20H (N in S79) the control circuit 11 increments the variable j by 1 (S76), and proceeds to Step S72 to let the array variable C2 ($j$) equal the array variable C1 ($i$). That is, if "the character under processing which is a candidate for an addition to the output character string" is not a control code or a space code, the current character (i) of the input character string is added as it is to the output character string (j←j+1).

As described above, if either of "the last character of the output character string under processing" or "the character under processing which is a candidate for an addition to the output character string" is not a control code or a space code, the current character (i) of the input character string is added as it is to the output character string (j←j+1).

In step S79, when C1 ($i$) is within 00H to 20H (Y in S79), the control circuit 11 proceeds to step S73 if C2 ($j$) is 0DH (Y in S80). As described above, if "the last character of the output character string under processing" is a line feed code, and "the character under processing which is a candidate for an addition to the output character string" is a control code or a space code, "the character which is a candidate for an addition to the output character string" is not added (Steps S76 and S72 are not performed). Thus, control information or a space which follows a line feed is deleted.

In step S79, if C1 ($i$) is within 00H to 20H (Y in S79) and C2 ($j$) is not 0DH (N in S80), the control circuit 11 regards C2 ($j$) as being 20H from Y in step S75 and steps S77, S78, and then checks whether C1 ($i$) is 0DH (S81). That is, if "the last character under processing of the output character string" is not a line feed code, then the control circuit concludes that it is a space, and checks whether "the character which is a candidate to be added to the output character string" is a line feed (S81).

In step S81, if C1 ($i$) is 0DH, the control circuit lets C2 ($j$) equal 0DH (S82), and returns to step S73. That is, if "the last character of the output character string under processing" is a space, and "the character which is a candidate for an addition to the output character string" is a line feed, "the last character of the output character string under processing" is changed to a line feed code, and "the character which is a candidate for an addition to the output character string" is not stored (Steps S76 and S72 are not performed).

In step S81, if C1 ($i$) is not 0DH, the control circuit sets C2 ($j$) to 20H (S83), and returns to S73. That is, if "the last character of the output character string under processing" is a space, and "the character which is a candidate for an addition to the output character string" is not a line feed, "the last character of the output character string under processing" is changed to a space code, and "the character which is a candidate for an addition to the output character string" is not added (Steps S76 and S72 are not performed).

FIGS. 17A to 17D are views showing concrete examples of FIG. 16, which will now be explained.

Figure 17A:
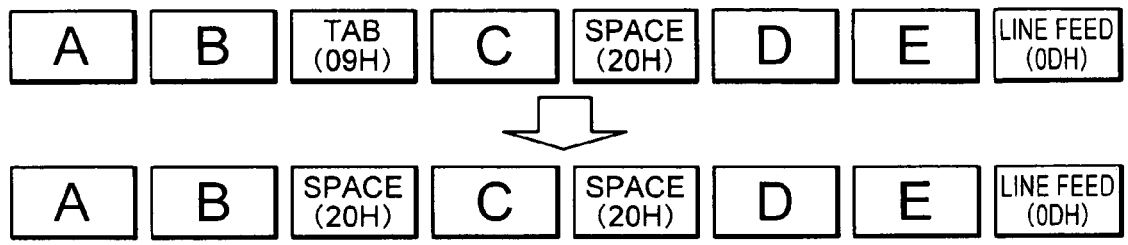
FIG. 17 is a view showing an example of the compression process.

In the third embodiment, control information except line feed is changed to a space by Y in step S75 (C2($j$) is a control code), N in step S77 (C2($j$) is not a line feed), step S78 (change to a space), Y in step S75 (control code), Y in step S79 (C1($i$) is a control code), N in step S80 (C2($j$) is not a line feed), N in step S81 (C1($i$) is not a line feed), and step S83 (change to a space) of FIG. 16. For example, as shown in FIG. 17A, a tab of control information is changed to a space.

Accordingly, it is possible to make notification of existence of control information even if the terminal does not support the control information. When the control information is a tab, the blanks are put together into one, whereby characters to be separated are distanced from each other, thereby reducing memory space, and effectively using the small display area.

Figure 17B:
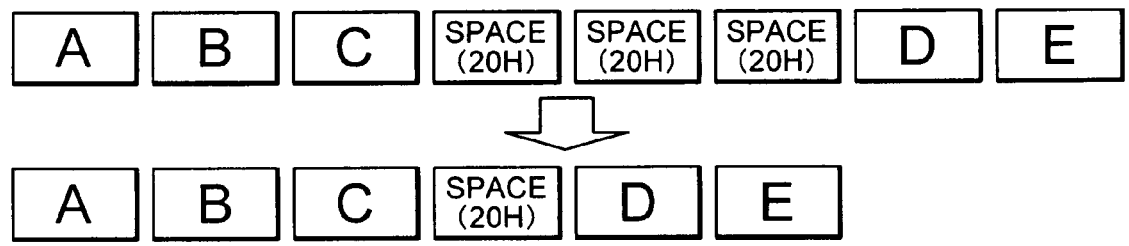

In the third embodiment, successive spaces are put together into one space by performing step S74 without performing steps S76 and S72, after Y in step S75 (C2($j$) is a control code), N in step S77 (C2($j$) is not a line feed), step S78 (change to a space), Y in step S79 (C1($i$) is a control code), N in step S80 (C2($j$) is not a line feed), N in step S81 (C1($i$) is not a line feed), and step S83 (change to a space) of FIG. 16. For example, as shown in FIG. 17B, three successive spaces are put together into one space. Accordingly, memory space is reduced, and the small display area is effectively used.

Figure 17C:
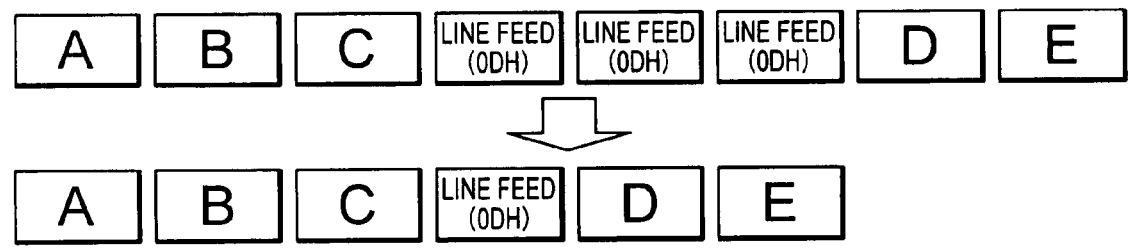

Further, in the third embodiment, successive line feeds are put together into one line feed by performing step S74 without performing steps S76 and S72, after Y in step S77 and Y in step S81 of FIG. 16. For example, as shown in FIG. 17C, three successive line feeds are put together into one line feed. Accordingly, memory space is reduced, and the small display area is effectively used.

Figure 17D:
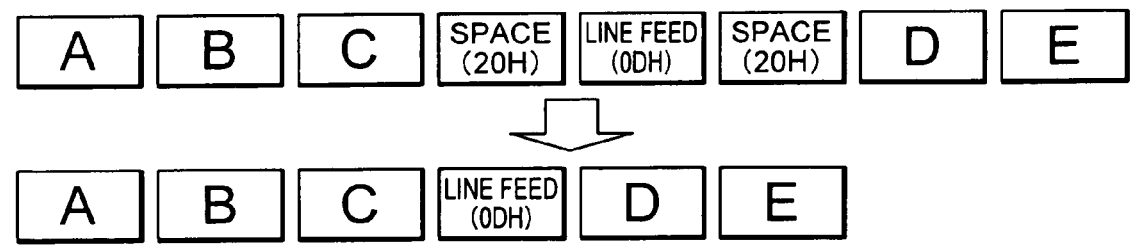

Further, in the third embodiment, successive line feeds are put together into one space by performing step S74 without performing steps S76 and S72, after Y in step S79 and Y in step S80, or after Y in step S75, Y in step S81 and step S82 of FIG. 16. For example, as shown in FIG. 17D, a succession of a line feed and spaces is replaced by one line feed. Accordingly, memory space is reduced, and the small display area is effectively used.

Figure 18:
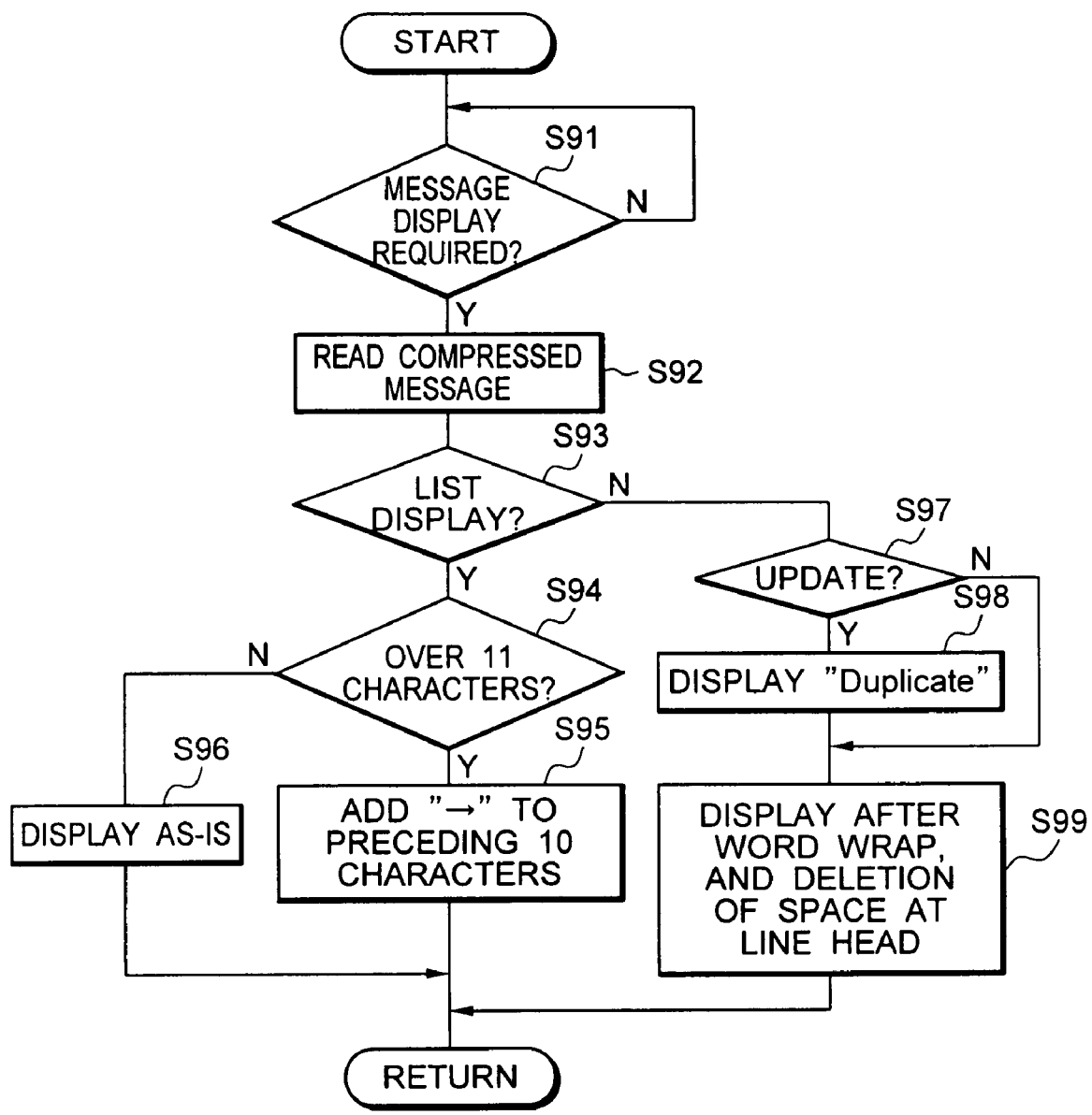
FIG. 18 is a flow chart showing a displaying process of this embodiment.

In the third embodiment, display of a text message is performed by reading a compressed text message from RAM as shown in FIG. 18. In a case where messages are displayed in list form such that one line containing 11 characters (where the place of the first character is used as a cursor) is allocated to one message, when the contents of one message exceeds 11 characters, "→" is indicated in the place of the eleventh character. Further, in a case where one message is exclusively displayed in detail, if it is a text message updated in the above-mentioned step S53, "Duplicate" is indicated to make notification of receiving the same message. In this detailed display, a word wrap processing (the processing for not spreading a word across lines) is performed, and the space at the beginning of a line is deleted.

The third embodiment is applicable to not only the cellular phone as described above, but also a stationary phone such as a tabletop phone and a wall-mount phone, and further a receive-only apparatus for text information other than telephones.

As described above, the third embodiment can reduce memory space when receiving successive line feeds or spaces, and make effective use of the small display area. Further, it is possible to make notification of the existence of received control information even if the terminal does not support the control information.

The fourth embodiment of the invention will now be explained with reference to FIGS. 19 to 22.

Figure 19:
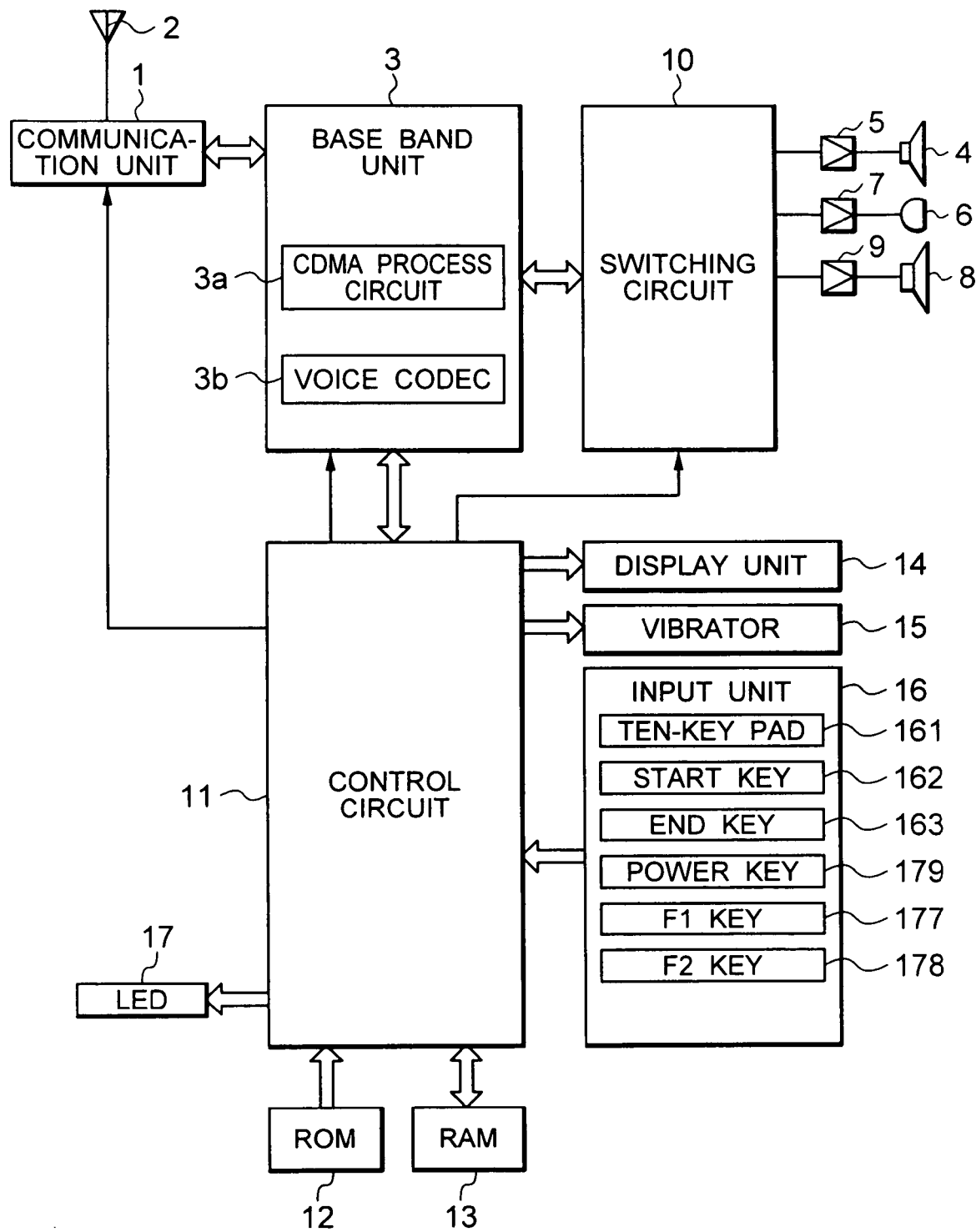
FIG. 19 is a block diagram showing principal elements of the fourth embodiment of the present invention.
Figure 20:
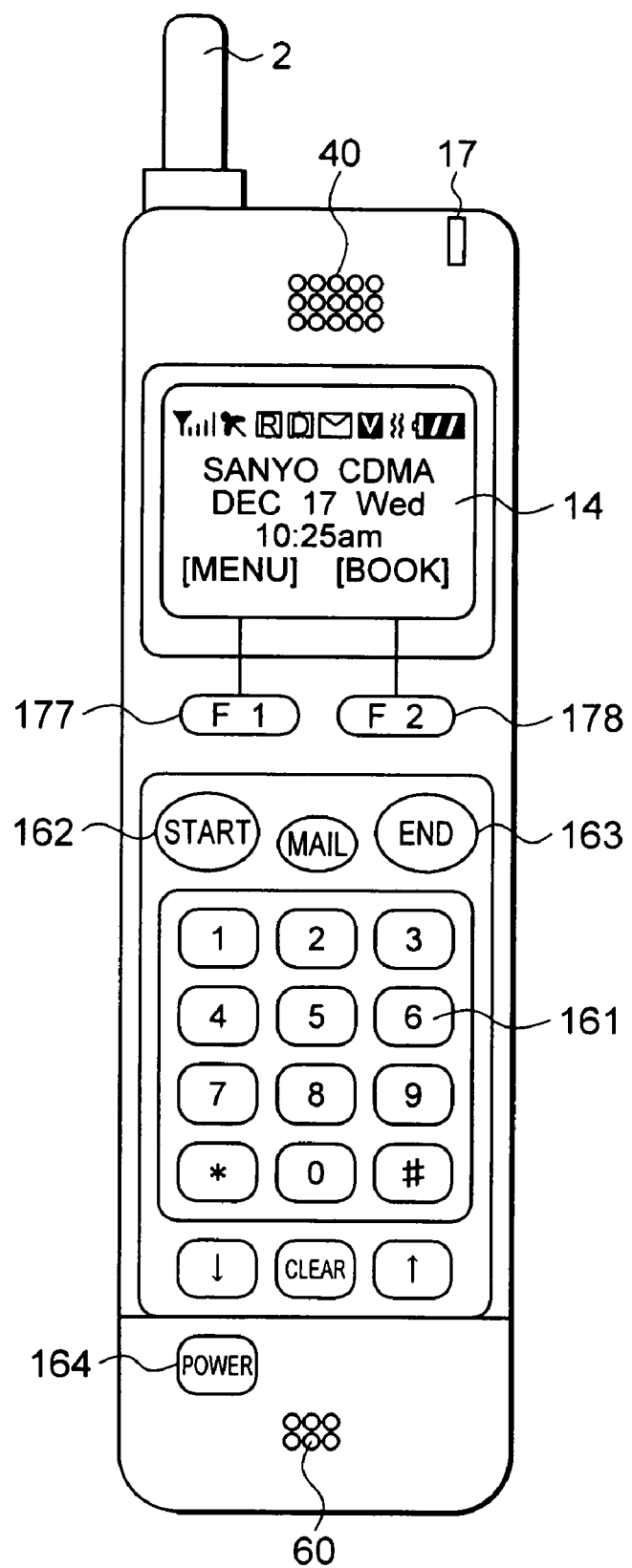
FIG. 20 is a front view of the fourth embodiment.

FIG. 19 is a block diagram showing principal elements of the embodiment, and FIG. 20 is a front view of the communication terminal. In these figures, the reference numerals which are the same as those in FIG. 1 represent the same elements. Explanation of the reference numerals 1 to 11 and 15 is omitted.

The communication terminal of this embodiment is also a cellular phone of the CDMA system which uses two or more carriers of the same frequency in the same cell.

Figure 22:
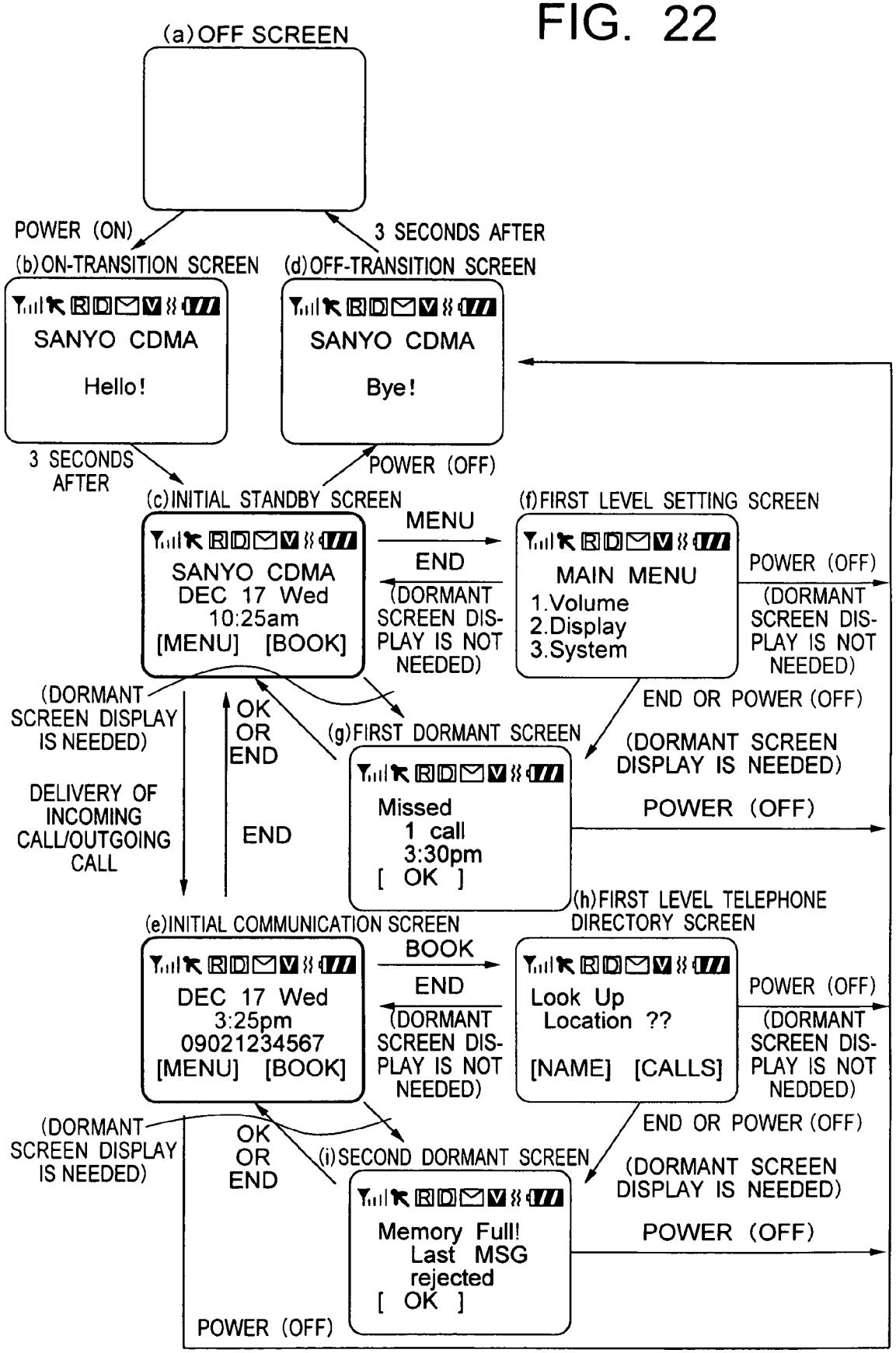
FIG. 22 is a view showing changes of a screen of the embodiment.

The liquid crystal display unit 14 displays two or more screens, as shown in FIG. 22.

The input unit 16 is not provided with the keys 164 to 167 of FIG. 1, but instead has a power key 179, and F1 key 177 and F2 key 178 as is the case with the embodiment of FIG. 12.

The power key 179 is operated for ON/OFF of the power supply of the apparatus.

F1 key 177 and F2 key 178 are operated for performing operations corresponding to texts displayed in the display unit 14. FIG. 20 shows an example of F1 key 177. There is indication "MENU" in the place in the display unit 14 corresponding to F1 key 177. In this display screen, F1 key 177 is operated to open a MENU screen.

LED 17 lights up to make notification of an incoming call.

Figure 21:
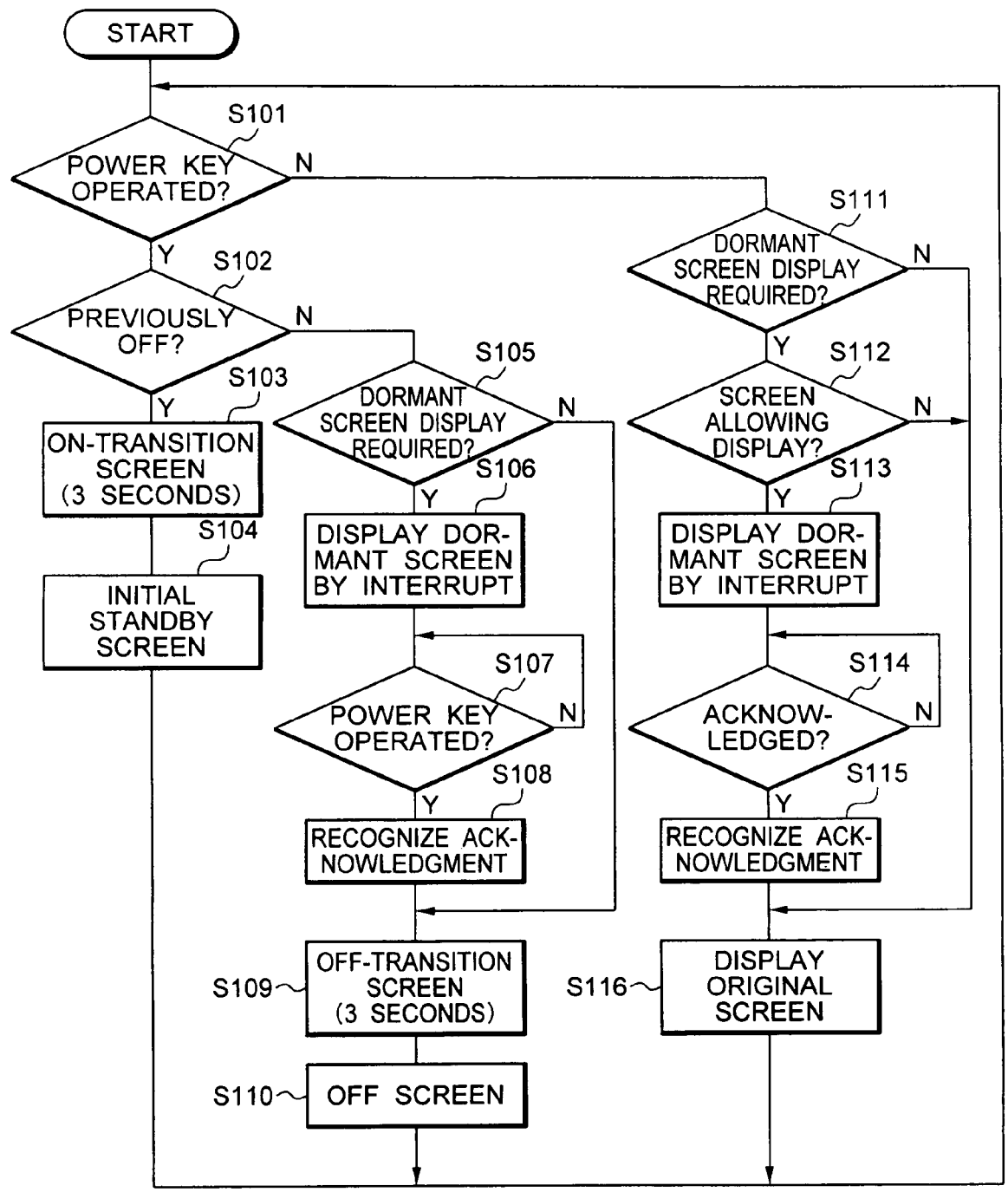
FIG. 21 is a flow chart showing principal operation of the fourth embodiment.

The principal operation of this embodiment will now be explained. FIG. 21 is a flow chart showing operation of the control circuit 11, and FIG. 22 is a view showing changes of the screen. In FIG. 21 and FIG. 22, a dormant screen is a screen on which information that should be notified to a user but is not urgent is displayed by an interrupt. If the user performs acknowledgement operation when a dormant screen appears, it will not appear thereafter. There are screens in which a dormant screen is allowed to appear by an interrupt when the necessity of displaying the dormant screen has occurred, and screens which do not allow a dormant screen to appear when the necessity of displaying the dormant screen has occurred. In this embodiment, a dormant screen is allowed to appear by an interrupt in an initial screen during standby and an initial screen during communication, and is prohibited in various setting screens or a telephone directory screen.

As examples of the dormant screen in this embodiment, FIG. 22 shows the first dormant screen (g) and the second dormant screen (i). The data of these screen displays and flags with respect to the necessity of display are stored in RAM 13. The first dormant screen (g) is for making notification that a text message has not been received normally for a certain reason (when driving through a tunnel for instance), and the second dormant screen is for making notification of memory overflow of text messages.

In FIG. 21, the control circuit 11 makes a dormant screen to appear by an interrupt (S113) when there is a dormant screen to be displayed which has not been acknowledged yet (S111) in a state where power on operation has not been performed yet (S101), that is, when there is a dormant screen flagging the necessity of display, and the screen currently displayed is such as to allow the dormant screen to appear (Y in S112). After the acknowledgement operation is performed in the dormant screen (N in S114), the control circuit cancels the flag of the dormant screen which has appeared (S115) determining that the dormant screen has been acknowledged. Then, the original screen with no interrupt is displayed (S116).

Operation of Steps S111 to S116 will now be explained with reference to FIG. 22. If there occurs a reception error of a text message while an initial standby screen (c) is displayed, the control circuit 11 makes the first dormant screen (g) to appear (Y in S111, Y in S112, and S113) since the initial screen on standby (c) is a screen allowing a dormant screen to appear. Here, if the end key 163 or F1 key 177 corresponding to indication of "OK" is operated, the control circuit causes display of the initial standby screen (c) which is to be displayed primarily (Y in S114, S115, S116) having recognized that the first dormant screen (g) has been acknowledged.

If F1 key 177 corresponding to indication of "MENU" is operated while the initial standby screen (c) is displayed by the control circuit 11, the first level setting screen (f) which is a lower layer of the initial screen (c) (a screen which appears when a selection operation is performed once in the standby screen) is displayed. While the first level setting screen (f) is displayed, if there occurs a reception error of a text message, the first dormant screen (g) is not displayed (Y in S111, N in S112, S116), since the first level setting screen (f) is a screen which prohibits the first dormant screen from being displayed.

Further, if an end key 163 is operated to return to the initial standby screen (c) while the first level setting screen (f) is displayed by the control circuit 11, the control circuit 11 cause the first dormant screen (g) to appear by an interrupt (Y in S111, Y in S112, S113), since the initial standby screen (c) being displayed is a screen which allows a dormant screen to appear. Here, if the end key 163 or F1 key 177 corresponding to indication of "OK" is operated, the control circuit causes display of the initial standby screen (c) which is to be displayed primarily (Y in S114, S115, S116) having recognized that the first dormant screen (g) has been acknowledged.

There is a second level setting screen as a lower layer of the first level setting screen (f) (a screen which appears by performing once a selection operation at the first level setting screen), though it is not shown in the drawing. This screen is a screen which prohibits a dormant screen from appearing. Accordingly, the control circuit 11 does not make a dormant screen appear at the second level setting screen, and makes the dormant screen appear when an operation for returning to the initial standby screen (c) via the first level setting screen (f) has been performed.

An initial communication screen (e) is a screen allowing a dormant screen to appear, while the second dormant screen which is at a lower layer of the initial communication screen (e) is a screen prohibiting a dormant screen from appearing. When there arises the necessity of displaying the second dormant screen (i) due to memory overflow of text messages, the control circuit 11 makes the second dormant screen (i) appear in the initial communication screen (e) through an interrupt (Y in S111, Y in S112, S113) as in the case of the above described initial standby screen (c) and the first level setting screen (f), but does not make the second dormant screen (i) appear in the first level telephone directory screen (h) (Y in S111, N in S112, S116).

The method of displaying a dormant screen such as steps S111 to S116 makes a dormant screen remain hidden without being acknowledged even if there arises the necessity of displaying a dormant screen in a screen which prohibits the dormant screen from appearing unless an operation for moving to a screen in which a dormant screen is allowed to appear is performed. This embodiment prevents a dormant screen from remaining unacknowledged by turning off the power.

In FIG. 21, when the power key 179 is operated (Y in S101) the control circuit 11 regards it as the operation for turning on the power if the power was off before the operation of the power key 179, thereby makes an on-transition screen appear for three seconds (S103), and thereafter displays the initial standby screen (S104) (See (a)→(b)→(c) of FIG. 22).

When the power key 179 is operated (Y in S101), if the power was not off before the operation of the power key 179, the control circuit 11 regards it as the operation of turning off the power (N in S102). If there is a dormant screen which needs to be displayed when the power key 179 is operated (Y in S105), the control circuit 11 makes the dormant screen appear through an interrupt (S106), and when the power key 179 is operated again (Y in S107), makes an off-transition screen appear for three seconds (S109) regarding the dormant screen as having been acknowledged (S108), and thereafter blanks the screen (s110).

When a dormant screen is being displayed in step S106, if the end key 163 or F1 key 177 corresponding to "OK" is operated instead of the power key 179, the same screen as the screen which appears when the end key 163 is operated instead of the power key 179 in step S101 is displayed, as shown in (g)→(c) or (i)→(e) in FIG. 22 (not shown in FIG. 21). Thus, when the user takes a look at the dormant screen after turning off the power, the user can make a selection between turning off the power and continuing the operation depending on the contents of the dormant screen.

If there is no dormant screen to be displayed when the power key 179 is operated in step S105 (N in S105), an off-transition screen is displayed for three seconds (S109) and thereafter the screen is blanked out (S110).

The operation of steps S101–S110 will now be explained with reference to FIG. 22. When the initial standby screen (c) is displayed, there is no dormant screen (a screen waiting for being displayed), since this screen allows any dormant screen to appear, and if there is a screen which needs to be displayed, it is displayed immediately. Accordingly, when the power key 179 is operated while the initial standby screen (c) is displayed, the control circuit 11 makes the off-transition screen (d) appear for three seconds, and thereafter makes an off screen (a) appear since there is no dormant screen to be displayed (Y in S101, N in S102, N in S105, S109, S110).

If there is no dormant screen to be displayed, when the power key 179 is operated in the first level setting screen (f), the control circuit 11 makes the off-transition screen (d) appear for three seconds, and thereafter displays the off screen (a) (Y in S101, N in S102, N in S105, S109, S110).

If there exists the first dormant screen (g) to be displayed, when the power key 179 is operated in the first level setting screen (f), the control circuit 11 makes the first dormant screen (g) appear through an interrupt (Y in S101, N in S102, Y in S105, S106). When the power key 179 is operated again, it confirms acknowledgement of the dormant screen, and cancels the flag of the first dormant screen (S108).

Further, it makes the off-transition screen (d) appear for three seconds, and thereafter displays the off screen (a) (S109, S110). If the end key 163 or F1 key corresponding to "OK" is operated instead of the power key 179 in the first level setting screen (f), the initial standby screen (c) is displayed (not shown in FIG. 21). Thus, the user can make a selection between turning off the power and continuing the operation.

As described above, in this embodiment, when a dormant screen remains hidden without being acknowledged, the dormant screen is displayed in step S106 when the power is turned off. Therefore, it is possible to prevent information to be notified from being missed.

Although the whole area of the display unit is used for displaying information to be notified in the above, it is possible to display information to be notified using a part of the screen allowing this information.

As described above, according to the fourth embodiment, when information to be notified is hiding without being acknowledged, it is possible to prevent the user from being unaware thereof.

The fifth embodiment of this invention will now be explained with reference to FIGS. 23 to 28C.

Figure 23:
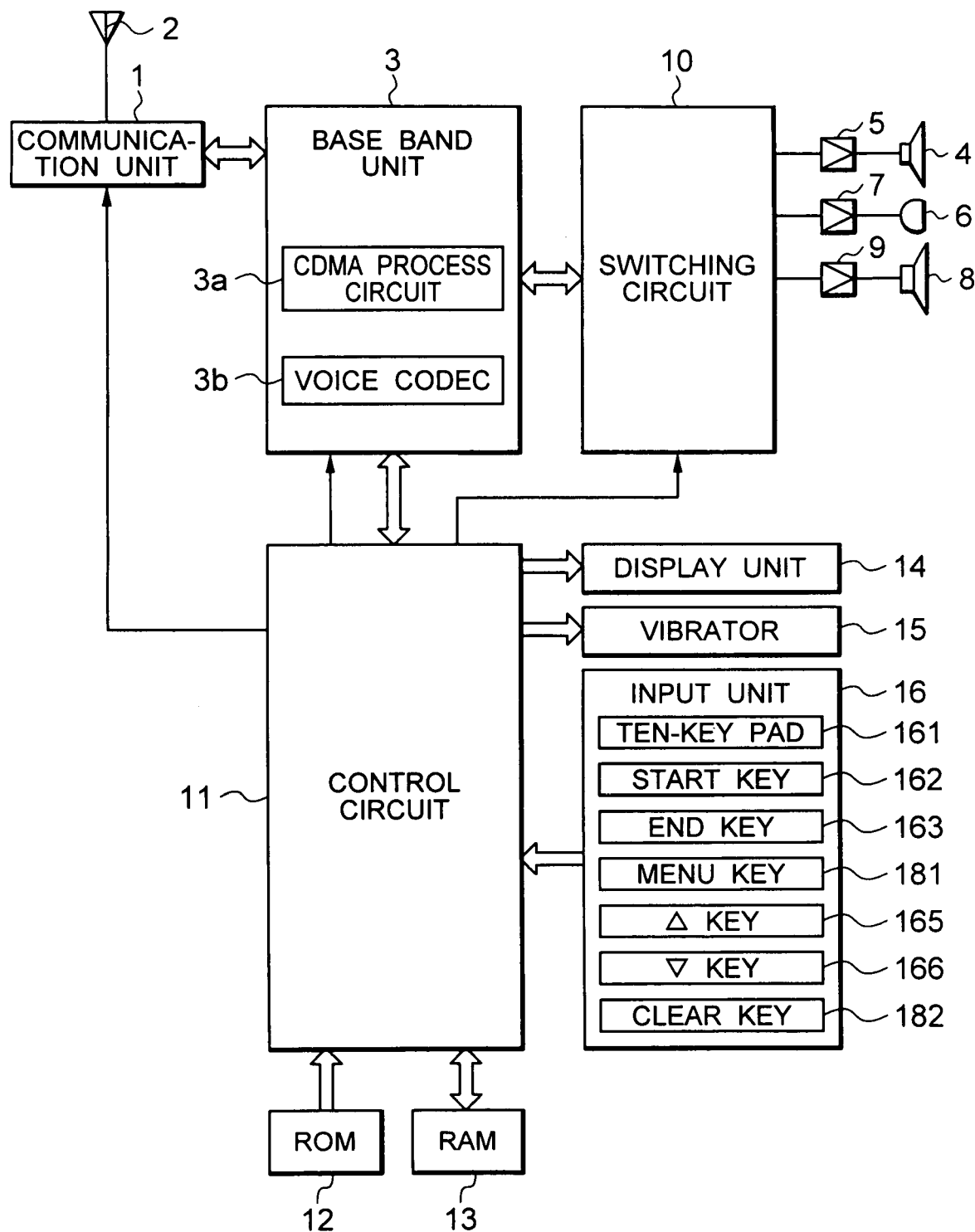
FIG. 23 is a block diagram showing principal elements of the fifth embodiment of the present invention.

FIG. 23 shows the circuit structure of the fifth embodiment. In this figure, the reference numerals which are the same as those in FIG. 1 represent the same elements. Explanation of the reference numerals 1 to 11 and 15 is omitted.

A liquid crystal display unit 14 displays telephone numbers and voice messages.

An input unit 16 is not provided with the keys 164 and 167 of FIG. 1, but has a menu key 181 and a clear key 182 instead.

A start key 162 is operated for originating a call, beginning a communication, etc. An end key 163 is operated for ending a communication, etc.

The menu key 181 is operated for displaying setting screens (lookup or edit of telephone directory, memo entry, volume of a received sound, etc).

Δ key 165 is operated for calling the previous page.

∇ key 166 is operated for calling the next page.

The clear key 182 is operated for terminating an operation to return to the original screen, or for erasing data.

The principal operation of the fifth embodiment will now be explained.

Figure 24:
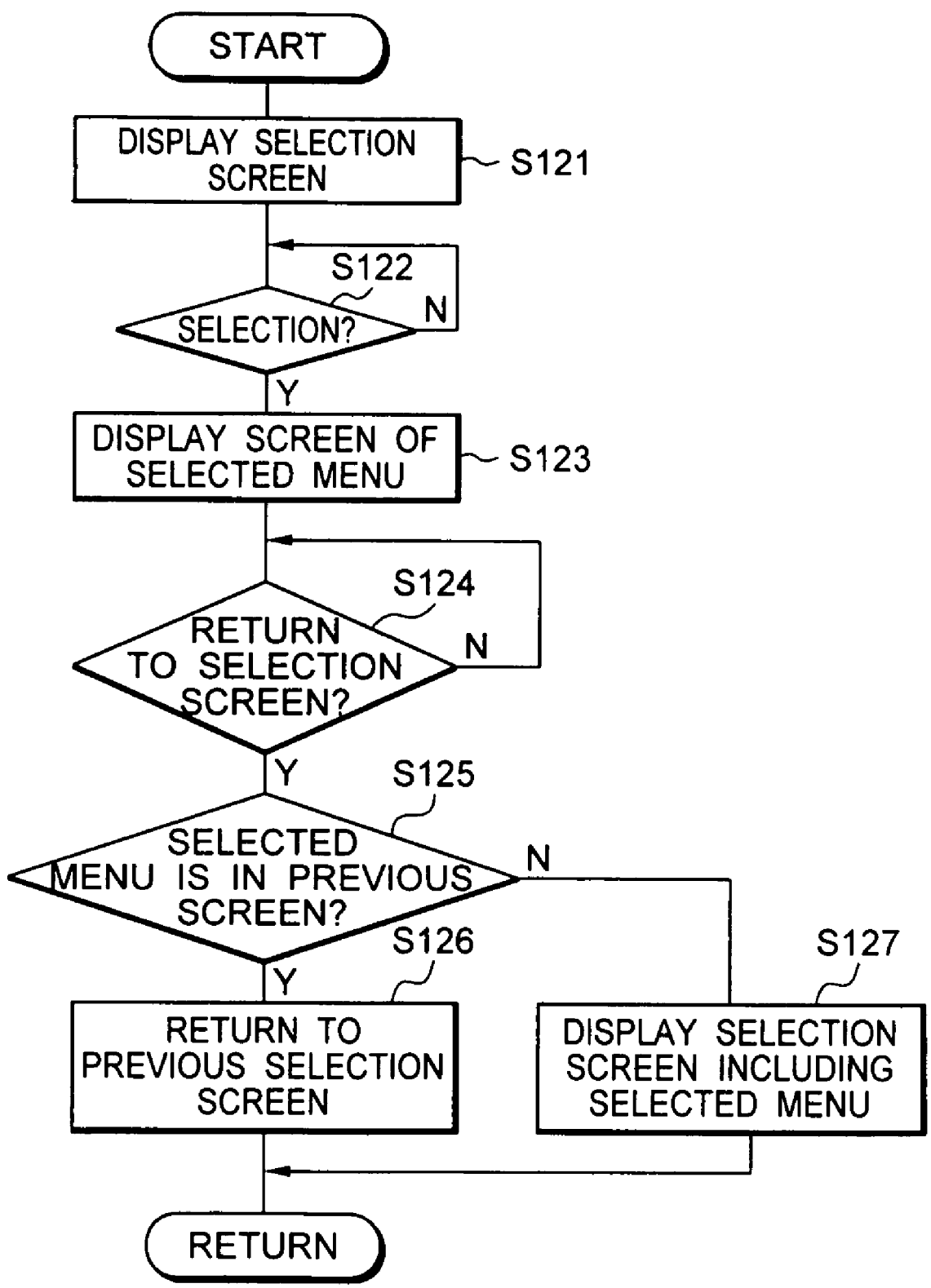
FIG. 24 is a flow chart showing principal operation of the fifth embodiment.

FIG. 24 is a flow chart showing operation of the control circuit 11. FIG. 25 is a view showing kinds of selection screen of the first layer and the second layer. FIGS. 26A to 26C and FIGS. 27A to 27C are views showing transition from the screen of the first layer to the screen of the second layer, and return from the screen of the second layer to the screen of the first layer.

As shown in FIGS. 25A to 25D, the number of options in the selection screen of the first layer is seven, while, the maximum number of options which can be displayed in the display unit 14 is four. Accordingly, the selection screen of the first layer includes the first page (1a) for displaying options 1 to 4 shown in FIG. 25A, and the second page (1b) for displaying options 5 to 7 shown in FIG. 25B. The control circuit 11 makes the second page (1b) appear, if ∇ key 166 is operated in a state where the first page (1a) is being displayed. The first page (1a) appears, if Δ key 165 is operated in a state where the second page (1b) is being displayed.

When the option 6 of the first layer is selected, there are seven options in the screen of menu 6 associated with the option 6 as shown in FIGS. 25C and 25D. The screen of menu 6 also includes the first page (2a) shown in FIG. 25C and the second page (2b) shown in FIG. 25D. The control circuit 11 switches between these pages in response to the operation of Δ key 165 and ∇ key 166.

The control circuit 11 performs selection in the first layer in response to an operation of the ten-key pad 161 (Y in S122) for designating option numbers indicated to the left of the names of the options being displayed regardless of the page being displayed (S121), and makes the screen of the selected option appear (S123). For example, regardless of whether the first page (1a) or the second page (1b) is being displayed in the selection screen of the first layer, if the 6 key of the ten-key pad 161 is operated, the screen of menu 6 associated with the option 6 is displayed.

If the clear key 182 is operated in the screen selected in step S123 (Y in S124), the control circuits 11 checks whether the selected option was displayed in the screen (original screen) in the first layer before moving to the second layer (S125). If it was displayed, the original screen is displayed (S126), and if not, the screen of the first layer including the selected option is displayed (S127).

Assume that the 6 key of the ten-key pad 161 is operated to display the selection screen (2a) of menu 6 shown in FIG. 26C in a state where the second page (1b) of the first layer is displayed as shown in FIG. 26B. If the clear key 182 is operated in this state, the display returns to the original screen (1b) in which the option 6 was displayed as shown in FIG. 26B.

Meanwhile, assume that the 6 key of the ten-key pad 161 is operated to display the selection screen (2a) of menu 6 shown in FIG. 27B in a state where the first page (1b) of the first layer is displayed as shown in FIG. 27A. If the clear key 182 is operated in this state, the second page (1b) of the first layer including the option 6 as shown in FIG. 27C is displayed, since the option 6 was not displayed in the first page (1a) of the first layer.

Conventionally, when the clear key 182 is operated after moving to FIG. 28B from FIG. 28A by selecting the option 6, the display returns to the first page (1a) of the first layer shown in FIG. 28C, and therefore, the selected option (option 6) is not displayed, which may pose a problem that it is uncertain which option has been selected.

The sixth embodiment will now be explained. In the fifth embodiment, options are displayed in two or more pages when they cannot be displayed in one screen. Instead, they are displayed by being scrolled in the sixth embodiment. FIGS. 29A to 29H are views showing kinds of selection screen of the first layer and the second layer. FIGS. 30A to 30D and FIGS. 31A to 31C are views showing transition from the screen of the first layer to the screen of the second layer, and return from the screen of the second layer to the screen of the first layer.

In any of the selection screens (FIG. 29A to FIG. 29D) of the first layer and the selection screens (FIG. 29E to FIG. 29H) of the second layer in the sixth embodiment, one line downward scroll is made each time ∇ key 166 is operated, and one line upward scroll is made each time Δ key 165 is operated.

Figures 30A, 30B, 30C, 30D:
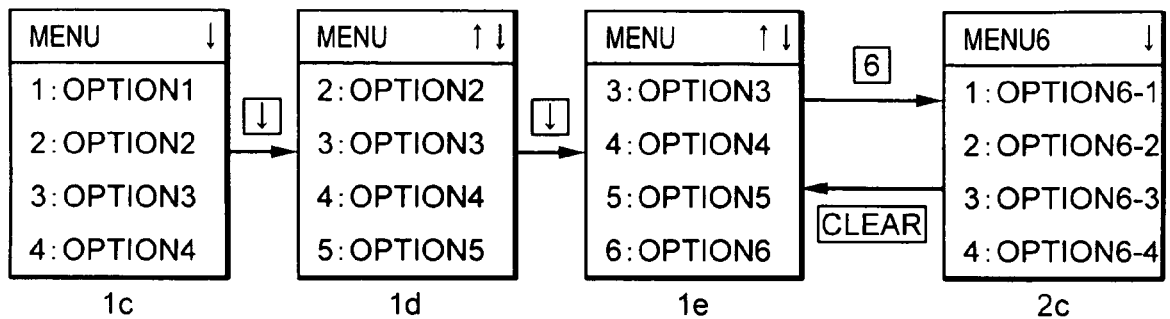
FIG. 30 is a view showing displays of screens of the sixth embodiment in case where a menu which has been selected was displayed in the previous selection screen.

For example, assume that the state is changed from FIG. 30A to (1e) of FIG. 30C by operating ∇ key 166 twice. In this state, the option 6 is displayed in the bottommost line. Assume that, in this state, the selection screen (2c) of menu 6 associated with the option 6 shown in FIG. 30D is displayed by operating the 6 key of the ten-key pad 161. In this state, when the clear key (182) is operated, it makes return to the original screen (1*e*) shown in FIG. 30C in which the option 6 was displayed.

Figures 31A, 31B, 31C:
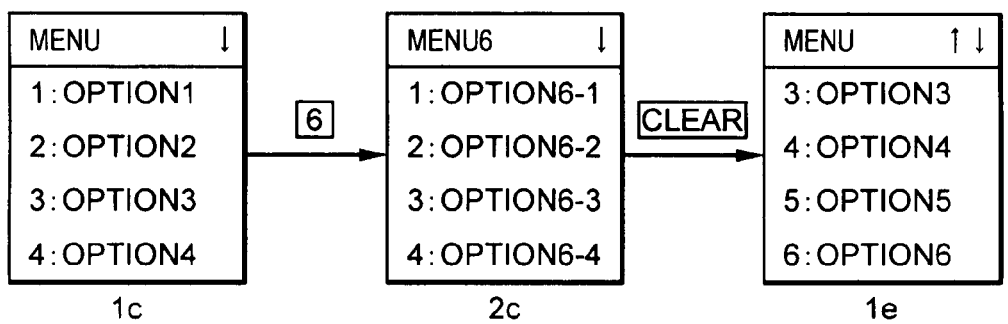
FIG. 31 is a view showing displays of screens of the sixth embodiment in case where a menu which has been selected was not displayed in the previous selection screen.

Assume that the selection screen (2*c*) of menu 6 associated with the option 6 shown in FIG. 31B is displayed by operating the 6 key of the ten-key pad 161 in a state where the first page (1*c*) which does not include the option 6 as shown in FIG. 31A is displayed. If the clear key 182 is operated in this state, the selection screen (1*e*) including the option 6 shown in FIG. 31C is displayed.

The seventh embodiment will now be explained. In the fifth embodiment, the option 6 also brings another selection screen. In the seventh embodiment, the screen associated with the option 6 is not a selection screen, but it is a screen in which information stored in RAM 13 (a telephone number looked up by name, for example) is displayed. FIGS. 32A to 32C and FIGS. 33A to 33C are counterparts of FIGS. 26A to 26C and FIGS. 27A to 27C of the fifth embodiment, where the screens associated with the option 6 are changed from the selection screens to information screens.

Figures 32A, 32B, 32C:
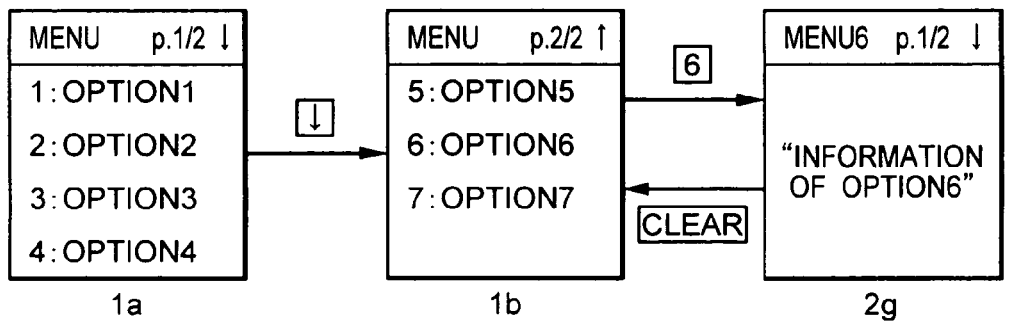
FIG. 32 is a view showing displays of screens of the seventh embodiment in case where a menu which has been selected was displayed in the previous selection screen.

Assume that the information displaying screen (2*g*) shown in FIG. 32C is displayed by operating the 6 key of the ten-key pad 161 after ∇ key 166 is operated to bring the state of FIG. 32B, in a state where the first page (1*a*) is displayed in the selection screen of the first layer as shown in FIG. 32A. If the clear key 182 is operated in this sate, it makes return to the original screen (1*b*) shown in FIG. 32B in which the option 6 was displayed.

Figures 33A, 33B, 33C:
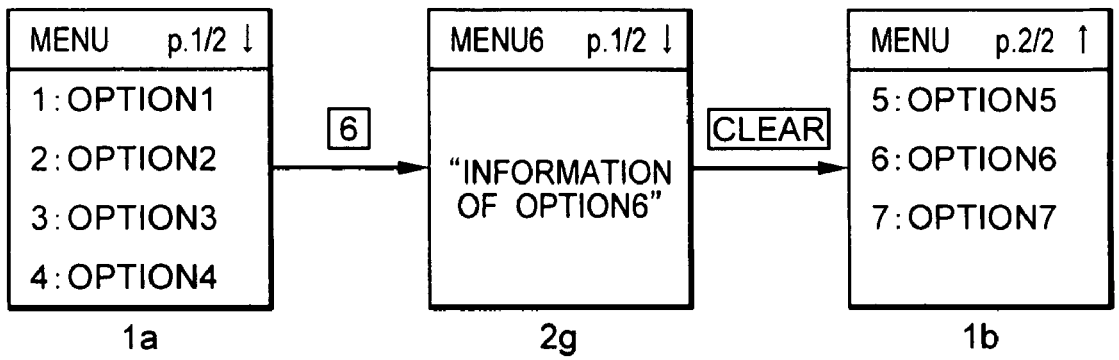
FIG. 33 is a view showing displays of screens of the seventh embodiment in case where a menu which has been selected was not displayed in the previous selection screen.

On the other hand, assume that the information displaying screen (2G) shown in FIG. 33B is displayed by operating the 6 key of the ten-key pad 161 in a state where the first page (1*a*) of the first layer is displayed as shown in FIG. 33A. If the clear key 182 is operated in this state, the second page (1*b*) of the first layer including the option 6 shown in FIG. 32C is displayed, since the option 6 was not displayed in the first page (1*a*) of the first layer.

The present invention is not limited to transition within layer-selecting screens as is the case with the seventh embodiment.

According to the fifth to seventh embodiments, the selection screen including the option which has been selected is displayed at the time of returning from the screen of the selected option to the original screen if the selected option was not displayed in the original screen. Therefore, the user can easily recognize the selected option.

The eighth embodiment will now be explained. In the selection method of the eighth embodiment, the option which has been selected is marked by a cursor in addition to the selection by the ten-key pad 161.

Figures 34A, 34B, 34C:
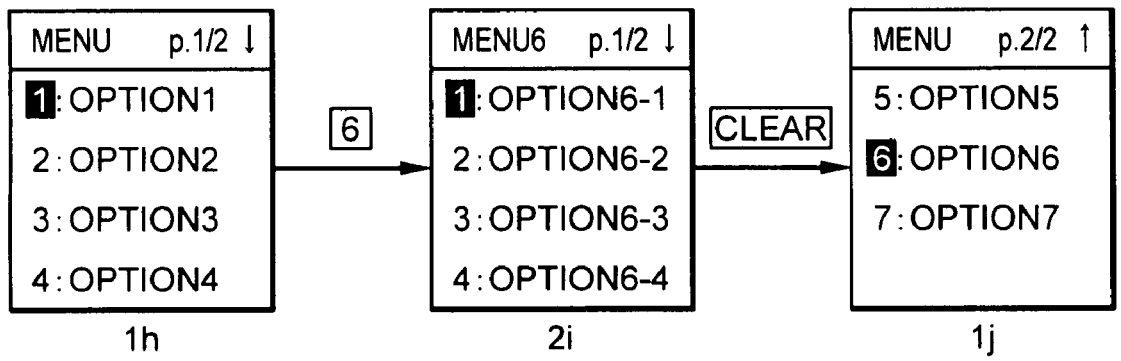
FIG. 34 is a view showing displays of screens of the eights embodiment in case where a menu which has been selected was not displayed in the previous selection screen.

If the clear key 182 is operated after the selection screen (2*i*) of menu 6 associated with the option 6 is displayed by operating the 6 key of the ten-key pad 161 in the first page (1*h*) in which the option 6 is not displayed as shown in FIGS. 34A to 34C, the selection screen (1*j*) including the option 6 at which the cursor is located is displayed.

Figures 35A, 35B, 35C:
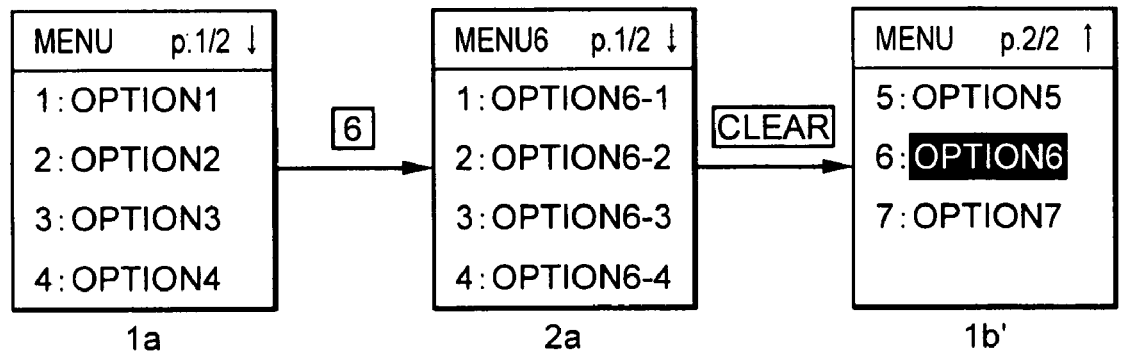
FIG. 35 is a view showing displays of screens of the ninth embodiment in case where a menu which has been selected was not displayed in the previous selection screen.

The ninth embodiment will now be explained. FIGS. 35A to 35C are views showing transition from the screen of the first layer to the screen of the second layer, and transition from the screen of the second layer to the screen of the first layer. FIG. 35C is a counterpart of FIG. 27C of the fifth embodiment, where the text "OPTION 6" of 1*b* of FIG. 27C is reversed. Thus, the selected option is marked.

In the eighth or ninth embodiment, the user can recognize which option has been selected with certainty, since the selected option is marked by a cursor or display in reverse.

The tenth embodiment of this invention will now be explained with reference to FIGS. 36 to 42.

Figure 36:
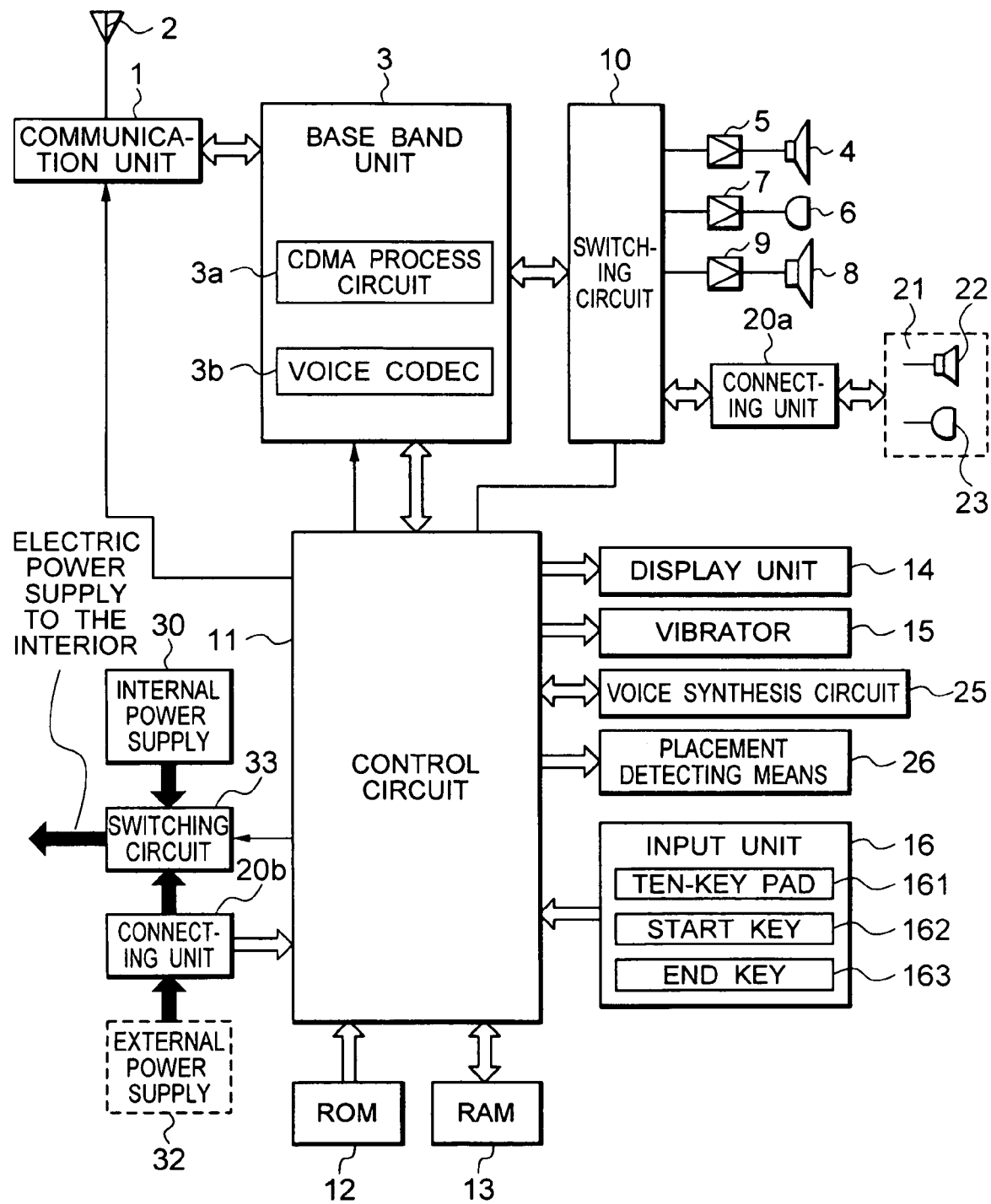
FIG. 36 is a block diagram showing principal elements of the tenth embodiment of the present invention.
Figure 37:
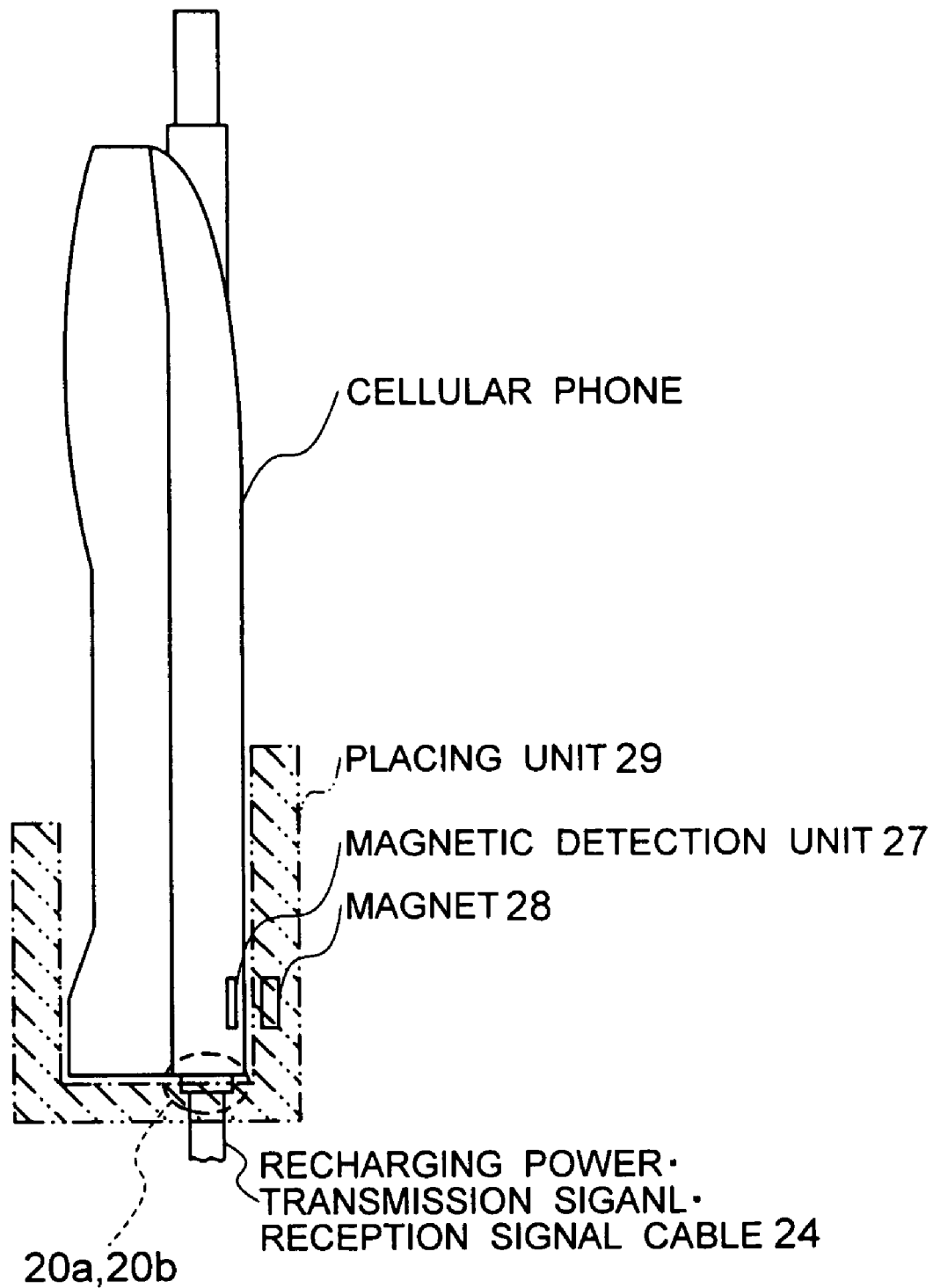
FIG. 37 is a view showing a communication terminal of the tenth embodiment carried in a vehicle.

FIG. 36 is a block diagram showing a communication terminal of this embodiment and an external device connected thereto. The communication terminal of this embodiment is also a cellular phone. In this figure, a dotted part indicated by a mark PT represents the cellular phone, and the exterior thereof represents the device connected to the cellular phone PT. FIG. 37 is a schematic side view showing the cellular phone carried in a motor vehicle.

In this figure, the reference numerals which are the same as those in FIG. 1 represent the same elements. Explanation of the reference numerals 1 to 9, 11, 12, 13, 15, and 16 is omitted.

The telephone of this embodiment is a cellular phone of the CDMA system which uses two or more carriers of the same frequency in the same cell.

The liquid crystal display unit 14 displays two or more screens, as shown in FIG. 22.

An external speaker 22 and external microphone 23 of a car kit 21 are connected to a connecting unit 20*a* through a cable 24 (FIG. 37). This external speaker 22 and the external microphone 23 are used for hands-free communication.

A switching circuit 10 makes connection of a baseband unit 3 with three amplification circuits 5, 7, 9 and connection with the connecting unit 20*a* under control of the control circuit 11 described later. These three amplification circuits 5, 7, and 9 have their gains fixed as in the case of the embodiment of FIG. 1, and therefore, it is not possible to change the volume of a received sound or the sensitivity of the microphone. A voice codec 3*b* of the baseband unit 3 performs change of the volume of a received sound and the sensitivity of the microphone under control of the control circuit 11.

Figure 41:
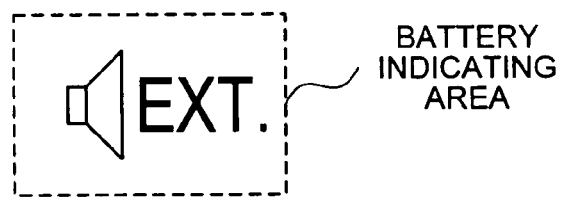
FIG. 41 is a view showing a display of a battery indication area in the car kit mode.
Figure 42:
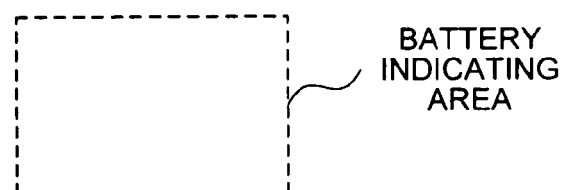
FIG. 42 is a view showing another example of display of FIG. 41.

The liquid crystal display unit 14 indicates an exhaustion level of a battery or indicates external speaker mode (See FIGS. 40 to 42).

A voice synthesis circuit 25 converts texts specified by the control circuit 11 into voice signals.

A placement detecting means 26 has a magnetic detection unit 27, such as a lead switch and a Hall element, etc. As shown in FIG. 37, a placing unit 29 with a magnet 28 is fixed to the vehicle. When the cellular phone is placed in it, the magnetic detection unit 27 in the proximity of the magnet 28 detects magnetism, and the placement detecting means 26 outputs a signal indicative of the cellular phone being placed, to the control circuit 11.

An internal power supply 30 comprises a rechargeable battery. The connecting unit 20*b* is connected to an external power supply 32 (battery in the vehicle) through the cable 24 (FIG. 37). A switching circuit 33 switches for power supply between the internal power supply 30 and the external power supply 32. When an ignition switch is turned ON, the voltage of the external power supply 32 is applied to the connecting unit 20*b*, and the connecting unit 20*b* notifies the control circuit 11 of this state. Then, the control circuit 11 causes switching from the internal power supply 30 to the external power supply 32. As described above, a determination whether the external power source is connected or not is made based on the voltage of the external power supply, and switching between the power supplies is performed depending on this determination.

Figure 38:
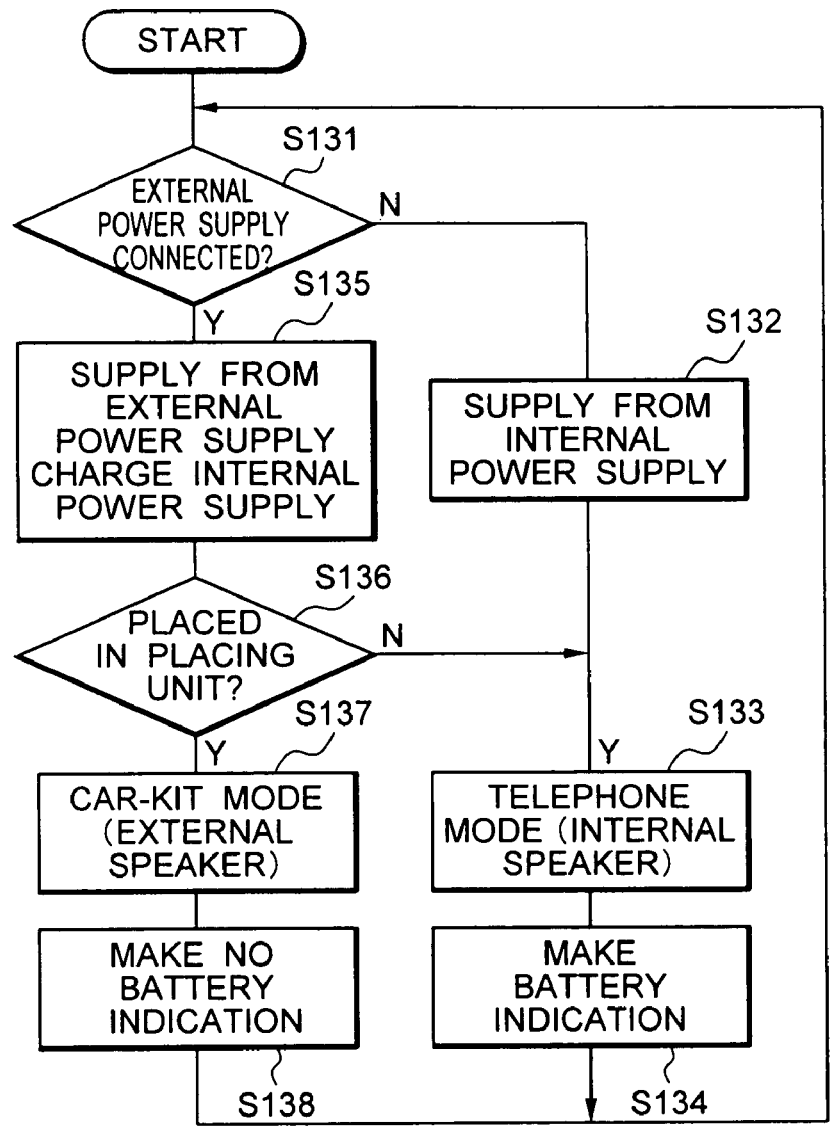
FIG. 38 is a flow chart showing principal operation of the tenth embodiment.
Figure 39:
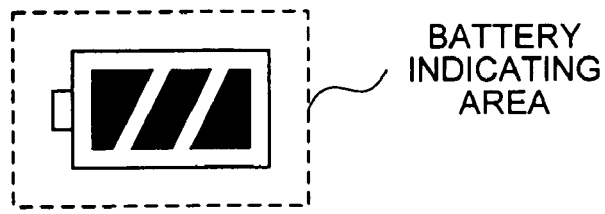
FIG. 39 is a view showing a display of a battery indicating area not in the car kit mode.
Figure 40A:
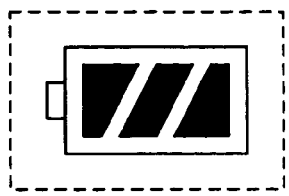
FIG. 40 is a view showing indication levels of exhaustion of a rechargeable battery.
Figure 40B:
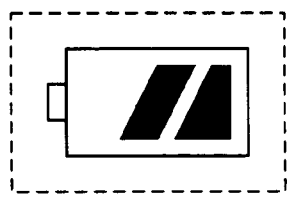
Figure 40C:
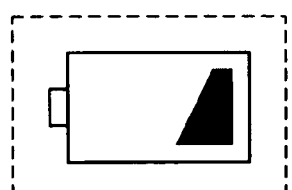
Figure 40D:
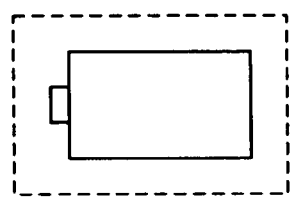

The principal operation of this embodiment will now be explained. FIG. 38 is a flow chart showing the operation of the control circuit 11. The control circuit 11 checks whether the external power supply 32 is connected through the connecting unit 20*b*, that is, whether the cellular phone PT is connected to the cable 24 through the connection unit 20*a*, 20*b* (S131). When connected to the cable 24, in addition to the external power supply 32, the external speaker 22 and the external microphone 23 are also connected to the cellular phone PT.

In step S131, if the external power supply 32 is not connected, the control circuit 11 makes the internal power supply 30 feed electric power to the cellular phone (S132). Then, a telephone mode where reception is made by using the internal speaker (4 or 8) is established (S133). An ear-speaker 4 and a loud speaker 8 are provided as the internal speaker. The loud speaker 8 is turned on and off by operating a key which is not shown. The control circuit 11 prohibits reception by the external speaker 22 in the telephone mode. Further, the control circuit 11 indicates the exhaustion level of the rechargeable internal power supply in the battery indication area of the display unit 14 as shown in FIG. 40 (S134). The exhaustion level is indicated in four levels as shown in FIG. 40.

In step S131, when the external power supply 32 is connected, the control circuit 11 supplies the electric power of the external power supply 32 to the cellular phone PT (S135). The internal power supply 30 is charged by the supply from the external power supply 32. The control circuit 11 checks whether the cellular phone PT is placed in the placing unit 29 by the placement detecting means 26 (S136). If it is not placed, the telephone mode is established by proceeding to step S133.

If it is placed (Y in step 136), the car kit mode where reception is made by using the external speaker is established (S137). Then, as shown in FIG. 41, an icon indicative of the car kit mode being established is displayed in the battery indication area of the display unit 14 (S138). As shown in FIG. 42, it is possible to indicate that the car kit mode has been established by displaying nothing in the battery indication area in consideration of its hardware or simplification of its software.

As described above, while the car kit mode is established when the cellular phone is carried in a vehicle and is being charged, since there is no necessity of indicating the exhaustion level of the internal power source, the indication of the car kit mode being established is made using the battery indication area. Thus, the small display area of the cellular phone can be used effectively.

In the above embodiment, when the cellular phone PT is raised from the placing unit 29, there arises a change from the car kit mode to the telephone mode, and the exhaustion level of the internal power supply is indicated even when it is being charged. It is for notifying a user of possible poor contact of the internal power supply (rechargeable dry battery) due to a shock given to the cellular phone at the time of raising the cellular phone or poor charging for other reasons.

In the above embodiment, although it is assumed that the battery charging continues when the cellular phone is raised (when the telephone mode is established), the invention is applicable to cases where the battery charging discontinues when the cellular phone is raised.

Although the switching circuit 20*b* switches between the external power supply 32 and the internal power supply 30 in the above embodiment, it is possible to supply the power to the interior of the apparatus and recharge the internal power supply 30 by connecting the external power supply 32 having the same voltage as the internal power supply 30 in parallel without making a provision of the switching circuit.

According to the tenth embodiment, while the car kit mode is established when the cellular phone is carried in a vehicle and is recharged, the indication of the car kit mode being established is made by using the battery indication area. Accordingly, the small display area of the cellular phone can be used effectively.

INDUSTRIAL APPLICABILITY

The communication terminal of the first embodiment of the present invention comprises:

a communication unit (1, 3) for receiving messages and type information of said messages from a station;

a display unit (14); and control means (11) which displays said messages received by said communication unit in list form in said display unit, a cursor which makes a selection from said messages displayed in list form having different patterns, said control means associating said patterns of said cursor with message types.

According to the above structure, even if a display screen is small, it is possible to display a cursor and messages types at a time, since the cursor displayed in a list also indicates message types.

The communication terminal of the second embodiment of the present invention comprises:

memory means (13) for storing messages received from a station;

a display unit (14); and control means (11) which groups received messages into new messages not yet reproduced by a user and old messages already reproduced, causes display of the number of said new messages in a predetermined area of said display unit when said new messages are stored in said memory means, and causes display of the number of said old messages in said predetermined area when said new messages are not stored in said memory means.

According to the above structure, it is possible to display the number of various types of message in a small area, since one of the number of old text messages and the number of new text messages is displayed depending on the existence of the new text messages.

The communication terminal of the third embodiment of the present invention comprises:

a reception circuit (3) for receiving text information including spaces;

a display unit (14);

a memory unit (13); and control means (11) which stores received text information in said memory unit combining successive spaces into one space, if said received text information has said successive spaces, and causes display of said stored text information in said display unit.

The communication terminal of the fourth embodiment of the present invention comprises:

a reception circuit (3) for receiving text information including line feeds;

a display unit (14);

a memory unit (13); and control means (11) which stores received text information in said memory unit combining successive line feeds into one line feed, if said received text information has said successive line feeds, and causes display of said stored text information in said display unit.

The communication terminal of the fifth embodiment of the present invention comprises;

a reception circuit (3) for receiving text information including spaces and line feeds;

a display unit (14);

a memory unit (13); and control means (11) which stores said received text information combining a series of a space and a line feed into one line feed if said received text information has said series of a space and a line feed, and causes display of said stored text information in said display unit.

The communication terminal of the sixth embodiment of the present invention comprises:

a reception circuit (3) for receiving text information including control information such as a line feed;

a display unit (14);

a memory unit (13); and control means (11) which stores received text information in said memory unit converting received control information except a line feed return into a space, and displays said stored text information in said display unit.

According to the above structure, it is possible to reduce memory space when receiving successive line feeds or spaces, and effectively use the small display area. Further, when the communication terminal receives any control information which the communication terminal does not support, it is possible to make a notification of the existence thereof.

The communication terminal of the seventh embodiment of the present invention comprises:

memory means (13) for storing information to be notified;

a display unit (14) for displaying a predetermined screen or said information to be notified;

an input unit (16) where operation is performed; and control means (11) which causes display of said information to be notified when operation is performed to turn off power supply in said input unit during display of said predetermined screen.

The communication terminal of the eighth embodiment of the invention comprises:

memory means (13) for storing information to be notified;

a display unit (14) for displaying an initial screen, a lower screen as a lower layer of said initial screen, and said information to be notified;

an input unit (16) where operation is performed; and control means (11) which allows display of said information to be notified in said initial screen and prohibits display of said information to be notified in said lower screen, and displays said information to be notified when operation is performed to turn off power supply in said input unit during display of said lower screen.

Said initial screen may be the one during standby or the one during communication.

According to the above structure, it is possible to prevent a user from being unaware of information to be notified and not yet acknowledged by turning off the power supply when it is hiding.

The communication terminal of the ninth embodiment of the present invention comprises:

a display unit (14) which displays a selection screen for selecting at least one of a plurality of options; and display control means (11) which causes display of options in said display unit by division or scroll to enable selecting an option not currently displayed in said display unit from the options to be selected, causes, when an option not currently displayed has been selected, a display of a screen associated with said selected option in said display unit, and performs a display so as to include said selected option when displaying said selection screen next.

According to the above structure, it is possible for the user to recognize easily which option has been selected, because the selection screen is made to include the selected option when the selected option was not displayed in the previous screen at the time of returning to the previous selection screen from the screen associated with the selected option.

According to the above structure, it is possible for the user to recognize easily which menu has been selected, because information indicating the option which has been selected is displayed at the time of returning to the previous selection screen from the screen associated with the selected option.

The invention claimed is:

1. A communication terminal comprising
a display unit which displays an original selection screen for selecting at least one of a plurality of options;
display control means which causes display of options in said unit; and
a key for selecting an option not currently displayed on said display unit from the plurality of options;
said display control means causing, when an option not currently displayed has been selected, display of a screen associated with said selected option on said display unit and causing display of said selected option in reverse when displaying said original selection screen next by operating another hardware key.

2. A communication terminal according to claim 1, wherein said display control means comprises display control structure.

3. A communication terminal according to claim 2, wherein said display control structure causes a display of the selected option by division.

4. A communication terminal according to claim 2, wherein said display control structure causes a display of the selected option by scroll.

5. A communication terminal according to claim 2, wherein said display control structure causes a display of a selected option word in reverse.

6. A communication terminal according to claim 2, wherein said display control structure causes, in response to activation of a clear key after the display of the screen associated with the selected option, a display of an original selection screen that includes the selected option in reverse.

7. A communication terminal according to claim 2, wherein said display control structure, in response to a hardware key selecting an upper layer option not currently displayed on said original selection screen, causes an immediate display of a plurality of lower layer options corresponding to the selected upper layer option.

8. A communication terminal according to claim 2, wherein said key for selecting an option not currently displayed comprises an alphanumeric key.

9. A communication terminal according to claim 2, wherein said display control structure causes said original display screen to display less than seven options, and wherein said display control structure causes, in response to activation of the 7 key while said original selection screen is displayed, display on said display unit of a plurality of information associated with a seventh option not displayed on the original selection screen.

10. A communication terminal according to claim 9, wherein said display control structure causes, in response to activation of the 7 key while said original selection screen displays a plurality of upper layer options, display on said display unit of a plurality of lower layer options associated with a seventh option.

11. A communication terminal according to claim 9, wherein said display control structure causes, in response to selection of a clear key while said display unit displays the plurality of information associated with a seventh option, display of an original selection screen including the seventh option.

12. A communication terminal comprising
a display unit which displays an original selection screen for selecting at least one of a plurality of options;
display control means which causes display of options in said unit by scroll; and
a key for selecting an option not currently displayed on said display unit from the plurality of options;
said display control means causing, when an option not currently displayed has been selected, display of a screen associated with said selected option on said display unit and causing display of said selected option in reverse when displaying said original selection screen next by operating another hardware key.

13. A communication terminal according to claim 12, wherein said display control means comprises display control structure.

14. A communication terminal according to claim 13, wherein said display control structure causes a display of a selected option word in reverse.

15. A communication terminal according to claim 13, wherein said display control structure causes, in response to activation of a clear key after the display of the screen associated with the selected option, a display of an original selection screen that includes the selected option in reverse.

16. A communication terminal according to claim 13, wherein said display control structure, in response to a hardware key selecting an upper layer option not currently displayed on said original selection screen, causes an immediate display of a plurality of lower layer options corresponding to the selected upper layer option.

17. A communication terminal according to claim 13, wherein said key for selecting an option not currently displayed comprises an alphanumeric key.

18. A communication terminal according to claim 13, wherein said display control structure causes said original display screen to display less than seven options, and wherein said display control structure causes, in response to activation of the 7 key while said original selection screen is displayed, display on said display unit of a plurality of information associated with a seventh option not displayed on the original selection screen.

19. A communication terminal according to claim 18, wherein said display control structure causes, in response to activation of the 7 key while said original selection screen displays a plurality of upper layer options, display on said display unit of a plurality of lower layer options associated with a seventh option.

20. A communication terminal according to claim 19, wherein said display control structure causes, in response to selection of a clear key while said display unit displays the plurality of information associated with a seventh option, display of an original selection screen including the seventh option.

21. A communication terminal comprising
a display unit which displays an original selection screen for selecting from among a plurality of upper layer options;
display control structure which causes display of upper layer options and lower layer options on in said display unit; and
a hardware key for selecting an upper layer option not currently displayed on said display unit;
said display control structure causing, when an upper layer option not currently displayed has been selected by said hardware key, (i) display on said display unit of a screen associated with said selected upper layer option, and (ii) display of said selected upper layer option in reverse when next displaying said original selection screen.

* * * * *